Aug. 4, 1959

H. J. CRAWLEY ET AL 2,898,041

INSTRUCTION MODIFIER MEANS FOR ELECTRONIC
DIGITAL COMPUTING MACHINES

Filed Dec. 21, 1953

INVENTORS.
HUBERT J. CRAWLEY AND CHRISTOPHER STRACHEY.
BY
ATTORNEY

Aug. 4, 1959 H. J. CRAWLEY ET AL 2,898,041
INSTRUCTION MODIFIER MEANS FOR ELECTRONIC
DIGITAL COMPUTING MACHINES
Filed Dec. 21, 1953

INVENTORS
HUBERT J. CRAWLEY AND CHRISTOPHER STRACHEY.

United States Patent Office 2,898,041
Patented Aug. 4, 1959

2,898,041

INSTRUCTION MODIFIER MEANS FOR ELECTRONIC DIGITAL COMPUTING MACHINES

Hubert John Crawley, Beckenham, and Christopher Strachey, London, England, assignors, by mesne assignments, to International Business Machines Corporation, New York, N.Y., a corporation of New York Application December 21, 1953, Serial No. 399,517

Claims priority, application Great Britain December 22, 1952

12 Claims. (Cl. 235—157)

This invention relates to electronic digital computing machines of the kind having a control system which includes an instruction store and also an additional store for retaining one or more digit groups for modifying the currently used instruction. Such a machine is described and claimed in the specification of copending patent application No. 165,434, filed June 1, 1950, now Patent No. 2,810,516, of Frederic C. Williams et al., and the present invention is concerned with an improvement in or a modification of the invention forming the subject of that application.

In machines of the kind referred to above an arithmetic or logical operation of data stored within a main store or memory device of the machine is performed by transferring individual multi-digit words, e.g. representing numbers, from this main store to an arithmetic unit or accumulator where they are subjected to the required operation, the result being subsequently transferred back to a desired location or "address" in said main store. These transfers are each effected under the control of an instruction which itself takes the form of a multi-digit word. Any particular instruction word becomes effective for the next operation to be performed, by virtue of being read out of the instruction store (which may be and usually is, the same main store) and fed to one or more static register devices or staticisors which convert the dynamic form signals constituting the word which is read out into sustained or static form signal potentials appropriate for governing the operation of the machine.

The nature of the successive instructions required to carry out a given computation is predetermined by the operator or "programmer" of the machine, but the machine is generally so constructed that it can itself perform operations upon the instruction words held in the machine and thus modify them during the course of a programme. In general the design of a machine is a compromise between attempts to reduce the labour of programming and to reduce the quantity of apparatus comprised in the machine. It has been found that a particularly advantageous compromise is afforded by the provision of the additional store for retaining the modifying digits or words referred to above and this store has become known in the art as the "B store" and will be so termed hereinafter in this specification.

In a machine provided with such a B store, the facility is provided of modifying the instruction which is held in the instruction store and which is generally referred to as the "presumptive instruction" by means of a word or digit group from the B store, as such presumptive instruction is read out from the instruction store. The operation of this facility is under the ultimate control of the programmer and may be determined within the machine by a certain digit or collection of digits of the presumptive instruction itself, these digits being conveniently termed the B control digits.

Each instruction word comprises a number of digits, usually equal to the number of digits in a number word within the machine, one group of such digits (known as address digits) serving to define the address of the data word which is to be operated upon and a further group of such digits (known as function digits) serving to define the operation which is to be performed upon that word. A set of operations which often occur as a group within a computation programme takes the form of an arithmetical operation performed between a word from one address location (P) and a word from another address location (Q), the result of the arithmetical operation being then transferred to a required address location (R). If, therefore, each instruction word has only one set of address digits therein, three separate and sequential instructions will be required to complete the group of operations, the first to transfer the word from address P to the arithmetical organ, the second to transfer the word from address Q to the same arithmetical organ and the third to transfer the result from the arithmetical organ to the address R. An economy of time can be obtained by arranging that each instruction word contains three sets of address digits together with a set of function digits appropriate to the group of operations which is to be performed. Such single instruction will result in the three steps being performed in immediate succession without the added time delay and complication of selecting and using two separate further instructions. Other arrangements are possible in which two addresses or more than three addresses are included in each instruction word and machines embodying such arrangements are known as multi-address machines and will be so referred to hereinafter.

The present invention is based upon the observation that it is a frequent requirement when using a multi-address machine, e.g. a three-address machine, to modify each of the addresses or a combination of them in the multi-address instruction word, by a common B digit group and that this fact can be utilised to effect an economy in the B storage facilities of the machine and also, in certain cases, in the programmer's time.

According to the broadest aspect of the invention, in a multi-address machine comprising a B store, means are provided whereby a B digit group is enabled, at the programmer's choice, to modify either one only or more than one of the addresses comprised in an instruction. The said means may preferably be such that the B digit group is enabled to modify any single one or any desired combination of the addresses in an instruction.

The B digit group referred to in the preceding paragraph will normally have the same number of digits as one address of the multi-address instruction word. These digits, however, may, and usually will, form part of a longer B word including, for example, function-modifying digits as well as address-modifying digits.

The invention is especially advantageous when applied to machines which have means for modifying the stored B word itself. Such a facility is described, for example, in the specification of copending patent application No. 226,763, filed May 17, 1951, now Patent No. 2,800,277, of F. C. Williams et al. This is due to the fact that one typical sequence of operations in a programme involves repeatedly modifying the addresses of a series of instructions and counting the number of repetitions. Thus, for example, it is often required to perform an operation between a word from an address $(P-b)$ and a word from address (Q) and then to transfer the result to address $(R-b)$, where $b$ has in turn the values B, $B-1$ . . . 2, 1, 0. Another type of problem which involves the further complication of modifying different combinations of the addresses of a series of instructions is exemplified by the following: If $x_n$ is the content of address $n$ in the main store, replace $x_n$ by $x_n(x_n \div 1)$ when $n=(P \div b)$ and $b$ has in turn the values of B, $B-1$ . . . 2, 1, 0. By means of the present invention, the repeated modifications of the addresses within the instruction word can be effected by repeated subtractions from a single group of B digits until the latter becomes a negative quantity, the instant when change of sign takes place, indicating the completion of the sequence of repetitions. It will be appreciated that such a scheme requires a much smaller volume of programming than would be required by the hitherto conventional method of providing a separate group of B digits for each of the different addresses and modifying each of these groups separately.

In order that the invention may be more readily understood two embodiments thereof will now be described with reference to the accompanying drawings in which Figs. 1, 2, 3, 4, 5 and 6 illustrate, in combination, the principal elements of a computing machine embodying the invention shown mainly in block schematic form.

Fig. 7 shows a modification of the arrangements of Fig. 5.

Figs. 8 and 9 comprise a series of diagrams illustrating a number of electric waveforms employed within the machine.

In the accompanying drawings extensive use has been made of symbolic representation of various well known circuit elements. Thus the symbol shown at Fig. 11a indicates a two-stable-state trigger circuit, one convenient circuit form of which is illustrated in Fig. 11b.

Figure 11:
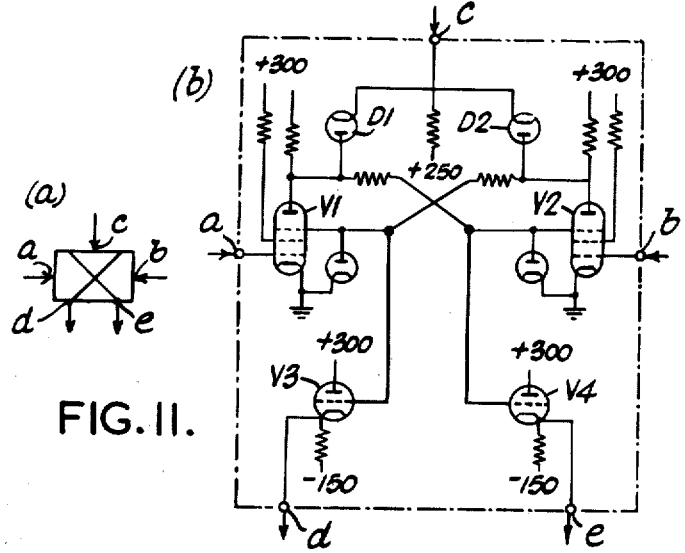

In the particular example shown in Fig 11b two pentode valves V1, V2 are cross-connected between their anodes and suppressor grids with D.C. connections to form a conventional two-stable-state trigger circuit. Such trigger circuit may be placed in its so-called "On" or triggered condition where valve V1 is cut off and valve V2 is turned full on by application of a negative pulse to its triggering input terminal $a$. When in this state the suppressor grid of valve V1 is driven negative to provide a negative-going output as its "1" terminal $d$ through cathode follower valve V3. At this time, the opposite or "0" output terminal $e$, supplied through cathode follower valve V4, is at earth potential. Setting of the trigger circuit to its "Off" or reset condition in which valve V2 is cut off and valve V1 is turned on, is effected by application of a negative pulse to the reset terminal $b$. Under this condition the output potentials are reversed, that at "1" terminal $d$ being raised to earth potential and that at "0" terminal $e$ being negative. In some circumstances, instead of or as well as separate setting of the circuit into either one of its two conditions as already described, the facility is required for effecting reversal of the circuit from its existing to its opposite condition. This is effected by the application of a negative-going pulse to the reversing terminal $c$ from which such pulse is fed through one or the other of the diodes D1, D2 to the suppressor grid of the valve which happens to be turned on at that time.

Similarly the symbol such as that indicated at Fig. 12a denotes a conventional "And" type gate circuit. One example is shown in Fig. 12b comprising a plurality of diodes D10, D11, D12 . . . having their cathodes interconnected and joined by way of resistance R1 to a source of negative potential and having their respective anodes separately connected to controlling input terminals $f$, $g$, $h$. . . . The output at the common cathode point of the diodes is fed to the output terminal $k$ by way of cathode follower valve V5. As is well known in such devices it is necessary for each and every one of the different input terminals to be driven negative simultaneously before any negative-going output is available at the output terminal $k$. The number of separate inputs is variable according to requirements. Such an "And" gate device will, for brevity, be referred to hereinafter as a "gate."

Figure 13:
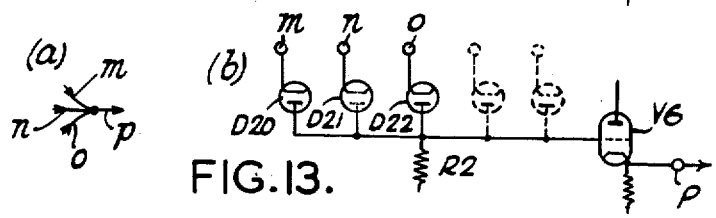

The symbol such as that indicated at Fig. 13a denotes what is known as an "Or" gate or buffer. One form of this type of circuit is shown in Fig. 13b and comprises a suitable number of diodes D20, D21, D22 . . . having their anodes interconnected and joined by way of resistance R2 to a source of positive potential and having their respective cathodes connected to individual input terminals $m$, $n$, $o$. . . . The common anode point is connected to an output terminal $p$ through cathode follower valve V6. With such an "Or" gate or buffer, the application of a negative potential to any input terminal will provide a negative-going output at terminal $p$ regardless of the potentials applied to the other input terminals. For brevity such a device will hereinafter be called a "buffer."

The machine shown in Figs. 1-6 resembles that described by F. C. Williams, T. Kilburn and G. C. Tootill in the Proceedings of the Institution of Electrical Engineers, Part II, No. 61, February 1951, pages 13-28 (hereinafter called "Reference A") and operates in the serial mode with binary numbers. Each number word and each instruction word has a total of 40 digits and, in dynamic form, is constituted by a pulse signal train comprising 40 sequential 10-microsecond digit intervals in each of which the binary value "1" is signalled by the presence of a square pulse negative-going from an earthed resting level during the first 6 microseconds of the 10-microsecond digit interval whereas the binary value "0" is signalled by the absence of such a pulse within the digit interval.

The machine utilises storage devices of the electrostatic cathode ray tube type as described in detail by F. C. Williams and T. Kilburn in the Proceedings of the Institution of Electrical Engineers, Part III, No. 40, March 1949, pages 81-100 (hereinafter called "Reference B") and the machine operates at a set rhythm by which each computation step of the programme is performed during a major cycle or "bar" which is made up of a predetermined number of equi-length minor cycles or "beats" formed by 45 consecutive digit intervals. In each of such beats, the first 5 digit intervals are assigned to the so-called "blackout" period during which the scanning beams of the cathode ray tube stores execute their flyback motion, the remaining 40 digit intervals constituting the operative digit intervals for signalling the 40 digit values of the various instruction or number words. Whereas in the machine described in the aforesaid reference A the rhythm was one of 4 beats to a bar, the present machine operates with an extended bar comprising 6 sequential beat periods.

Figure 8:
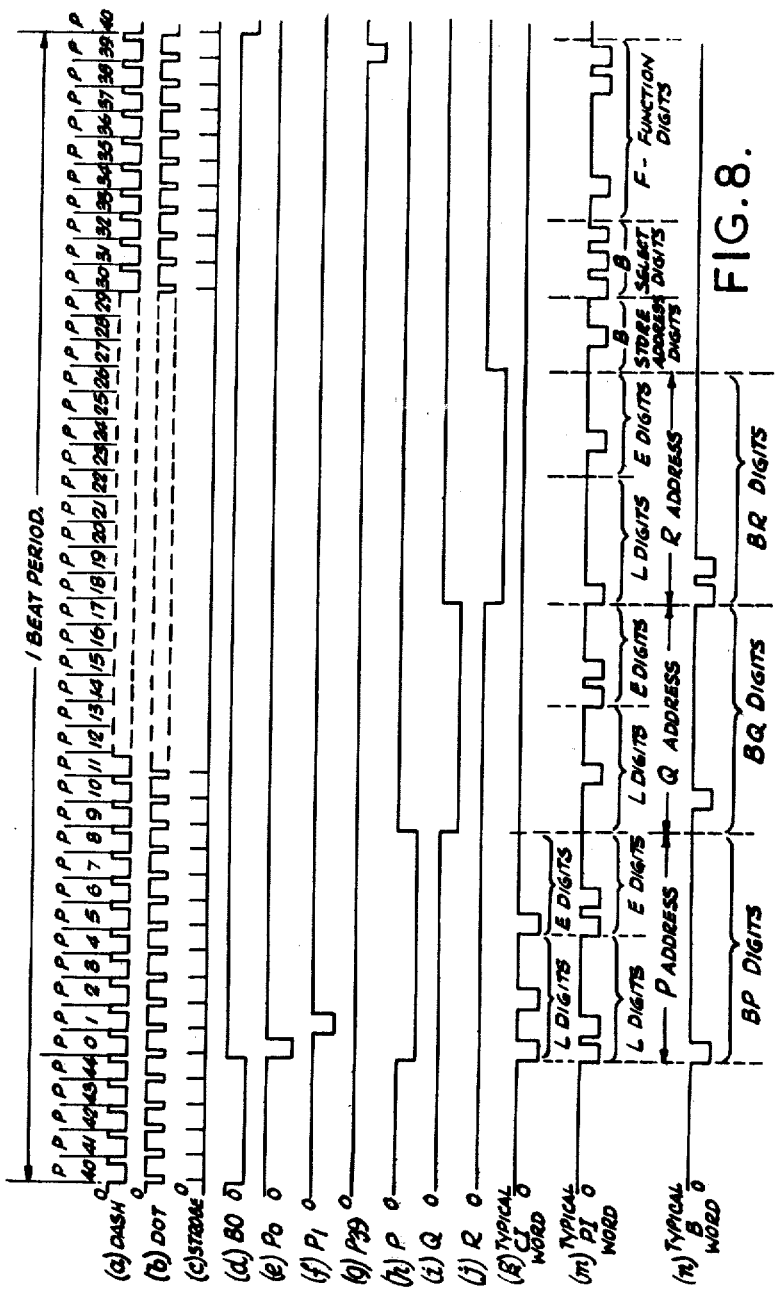
Figure 9:
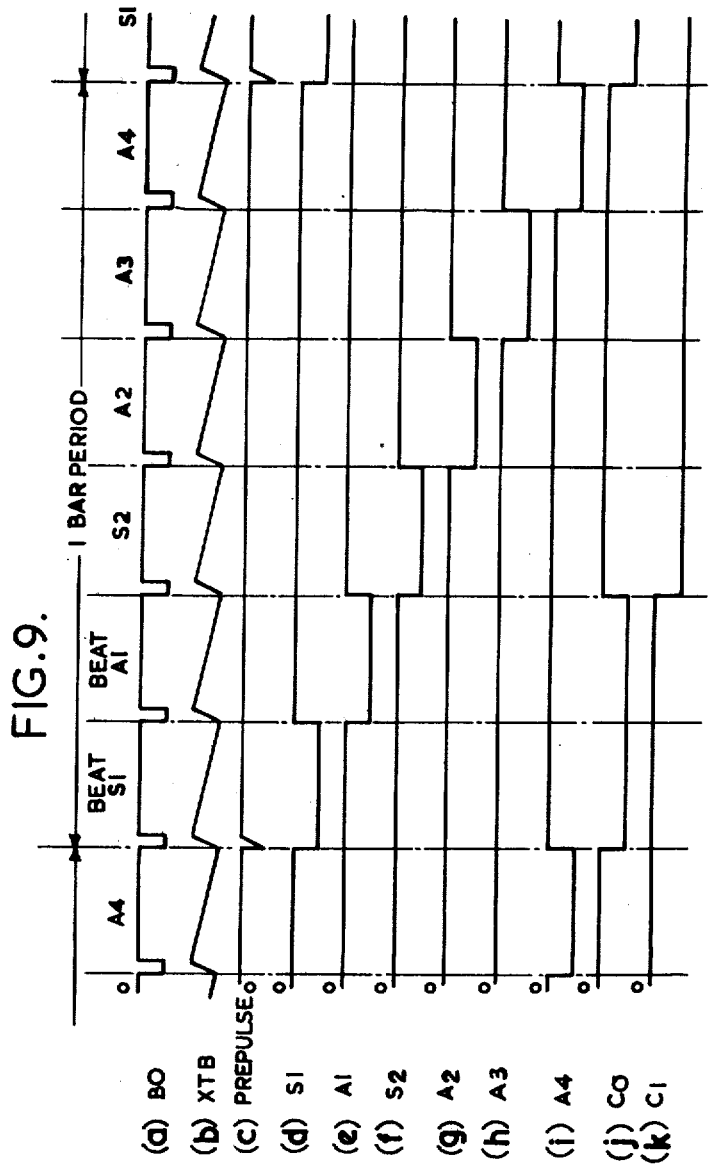

A machine is controlled, in the usual manner, by means of a plurality of electric waveforms. The majority of these are of a continuously repetitive character and are provided by the apparatus indicated in Fig. 1 and have the forms shown in Figs. 8 and 9. All waveforms are available in two forms, that shown and an inverse or antiphase form denoted by the prefix INV.

Figure 1:
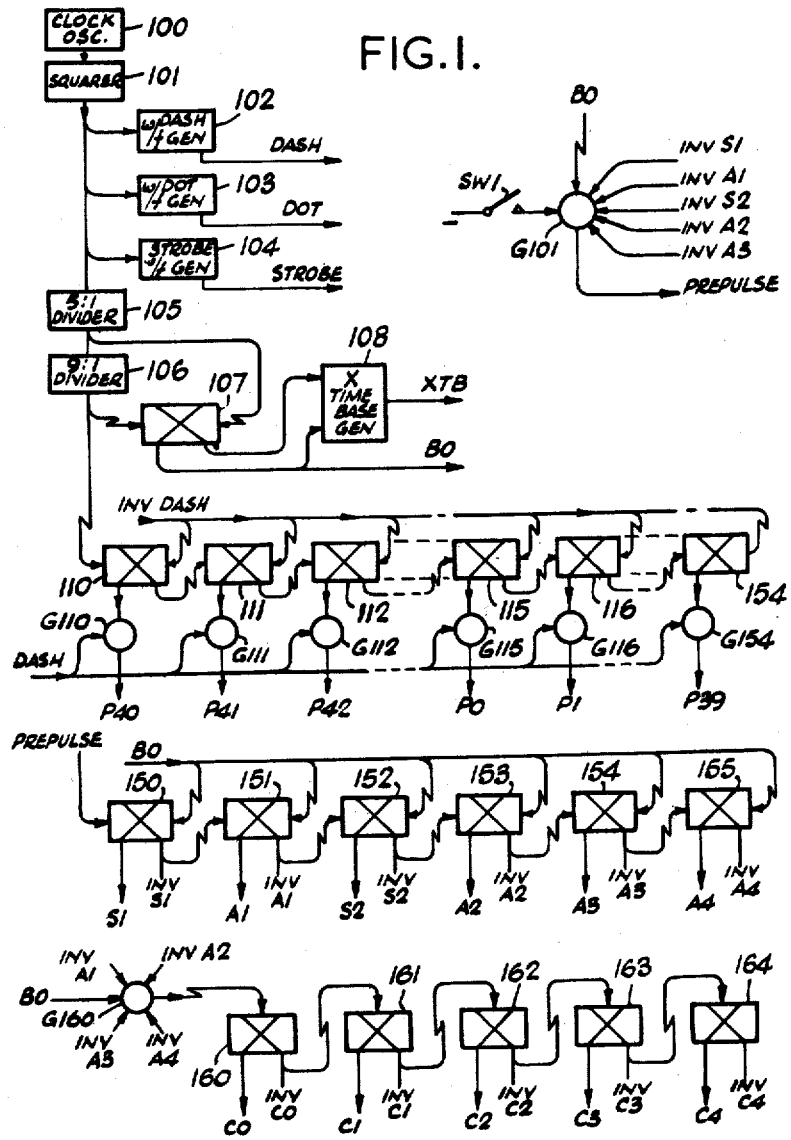

Referring now to Fig. 1 a 100 k.c./s. master or clock oscillator 100 has its output applied to a pulse squaring circuit 101 whose output is supplied to a monostable type trigger circuit 102 providing a 6 microsecond negative-going output pulse for each triggering input pulse. The resultant Dash waveform output is shown in Fig. 8a. The output from squarer circuit 101 is also applied to a second monostable type trigger circuit 103 providing a 2 microsecond negative-going output pulse for each triggering input pulse. The resultant Dot waveform is shown at Fig. 8b. The same output from squarer circuit 101 is applied to a third monostable type trigger circuit 104. This trigger circuit is arranged with a slight delay in its input triggering circuit and has a short pulse time period of about ½ microsecond only whereby its output is in the form of a series of sharp positive-going pulses occurring slightly later than the leading edge of each of the Dash and Dot pulses. This wave form, known as the Strobe waveform, is shown in Fig. 8c. These waveforms are the equivalent of those referred to in the aforesaid reference B and are used for operating the cathode ray tube stores and for other purposes in analogous manner.

The trigger circuits 102, 103 and 104 may be of any suitable form such as is described in M.I.T. Radiation Laboratory Series (McGraw-Hill), vol. 19, pages 166–171, while the squaring circuit 101 may likewise be of any convenient form such as described on page 166 of the same reference.

The output from pulse squaring circuit 101 is further applied to a pulse frequency divider circuit 105 effecting division by a factor of 5 and the output from this divider circuit is applied to a further pulse frequency divider circuit 106 dividing by a factor of 9. Each of these divider circuits may be of any convenient type, e.g. of the "Phantastron" type as described in British Patent No. 582,758 and U.S. Patent No. 2,549,874.

A two-stable-state trigger circuit 107 has its triggering input terminal supplied with the output of divider circuit 106 and its resetting terminal supplied with the output of divider circuit 105 each through suitable differentiating networks. The trigger circuit 107 is thus turned on at the end of each 45th output pulse from the pulse squaring circuit 101 and is turned off again 5 clock pulses later to provide the Blackout or BO output waveform shown in Fig. 8d. This BO waveform is also used to control a single sweep time base generator circuit 108 so as to terminate its run-down period and initiate its flyback period, while an opposite phase output version of the BO waveform, INV BO, from the trigger circuit 107 is also supplied to the time base circuit 108 to terminate the flyback period and initiate the linear run-down period. The output from circuit 108 constitutes the X time base waveform XTB, Fig. 9b, from which it will be seen that each linear run-down portion covers the 40 operative digit periods of each beat and each flyback portion the succeeding Blackout pulse period.

The output from divider circuit 106 is also applied through a differentiating network to the trigger input terminal of a two-stable-state trigger circuit 110 forming the first of a series of 45 similar trigger circuits 110 . . . 154. Each of these trigger circuits is supplied at its resetting terminal with the INV Dash waveform through differentiating networks while the triggering input of the second and each subsequent trigger circuit of the series is supplied with a differential output from the "0" output terminal of the preceding trigger circuit, whereby each following circuit is turned on as the previous circuit is turned off. The output from the "1" output terminal of each trigger circuit is applied to an associated one of a series of gates G110 . . . G154. These gates are each also supplied with the Dash waveform so that one gate in turn of the series of 45 gates is open during each of the 45 successive digit intervals of each beat to release through that gate one only of the Dash waveform pulses. This provides the series of so-called P-pulses of which three are shown in Figs. 8e, 8f and 8g.

A series of 6 two-stable-state trigger circuits 150 . . . 155 is arranged in the manner of a shifting register so that each subsequent circuit is turned on as the preceding circuit is turned off. The triggering input terminal of the first circuit 150 is supplied with a prepulse or starting signal (Fig. 9c) marking the commencement of each operative bar while the reset terminal of each circuit is supplied with the differentiated BO waveform. The "1" and "0" outputs from the first circuit 150 comprise pulses embracing the first beat following the starting signal and are known respectively as the S1 and INV S1 waveforms. The S1 waveform is shown in Fig. 9d. The second circuit 151 similarly provides output waveforms comprising a pulse embracing the second beat of each bar. These waveforms are known as the A1 and INV A1 waveforms of which the A1 waveform is shown in Fig. 9e. The remaining trigger circuits similarly provide the S2, A2, A3 and A4 waveforms shown in Figs. 9f, 9g, 9h and 9i and their inverse versions. The latter are not shown as their form will be obvious.

The Prepulse starting signal marking the commencement of each bar is provided by gate G101 which is supplied with the BO waveform through a differentiating network and is controlled by the INV S1, INV A1, INV S2, INV A2 and INV A3 waveforms and by a further negative potential supplied when manually controlled switch SW1 is closed. The resultant Prepulse waveform supplied by gate G101 and comprising a sharp pulse at the beginning of every S1 beat is shown in Fig. 9c.

For controlling store regeneration, as described in the aforesaid reference B, a series of counter waveforms are provided by the 5 trigger circuits 160 . . . 164. These are interconnected in the manner of a binary counter chain so that reversal of the first trigger circuit from its on to its off state reverses the state of the trigger circuit and so on. The common reversing terminal of the first trigger circuit 160 is by way of a gate G160 supplied with the BO waveform and controlled by the INV A1, INV A2, INV A3 and INV A4 waveforms. The output from the first trigger circuit 160, known as the C0 waveform, is shown in Fig. 9j whereas that from the second trigger circuit 161, known as the C1 waveform, is shown in Fig. 9k. The other counter waveforms C2, C3 and C4 are not shown but their form can be envisaged from the two examples given, each subsequent waveform being progressively of half the frequency of its predecessor in the series.

All of the waveforms referred to above, except the XTB waveform, have, in their direct version, a resting level of earth potential and an active (pulse) level appreciably negative to earth while the inverse or INV versions normally rest at the negative level and rise during the active pulse period to earth potential. Unless otherwise stated, the other waveforms referred to later have similar potential levels.

Figure 2:
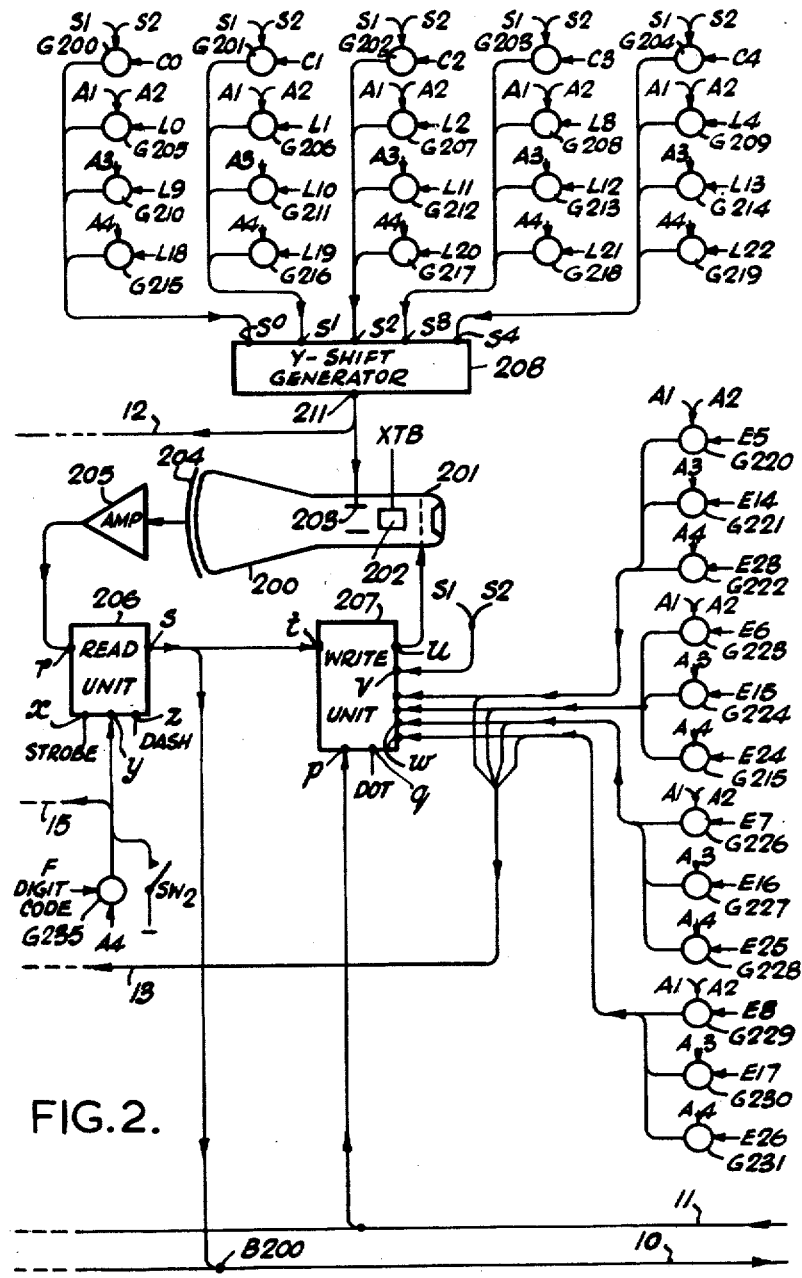

The main data store of the machine is shown in Fig. 2 and comprises a plurality of separate cathode ray tube devices as described in the aforesaid reference B but only one of these is shown. Each storage device comprises a tube 200 having a beam controlling electrode 201, X deflection plates 202, Y deflection plates 203 and a signal pick-up plate 204. The output from the latter is fed through an amplifier 205 to signal input terminal r of a read unit 206 whose form resembles that shown in such reference B and is also described in more detail later in connection with Fig. 14. The output at read-out terminal s of the read unit is applied to signal input terminal t of a write unit 207 which again resembles that of said reference B and is also described in more detail later in connection with Fig. 14. The output at terminal u of this write unit is applied to the beam controlling electrode 201 of the tube to complete the regenerative loop in the usual way. Selection of any particular one of the plurality of storage tubes for use at any particular time is effected in the manner as described in the aforesaid reference A by control of the so-called Blackout valve associated with the write unit 207 by potentials derived in a manner described later from certain staticisor sections controlled by the E digits of the instruction word. Repetitive scanning of the tube beam over each of 32 storage lines, each capable of recording one 40-digit word, is effected by application of the XTB waveforms to the X deflection plate 202 while selection of any particular storage line for operation during a beat period is controlled by the Y-shift generator circuit 208 whose form broadly resembles that referred to in reference B and is described in detail later in connection with Fig. 15. An external output from the read unit 206 of each tube is combined in a buffer B200 feeding a store output busbar 10. Similarly a store input busbar 11 is connected to an external write input terminal $p$ of each of the write units 207.

Figure 14:
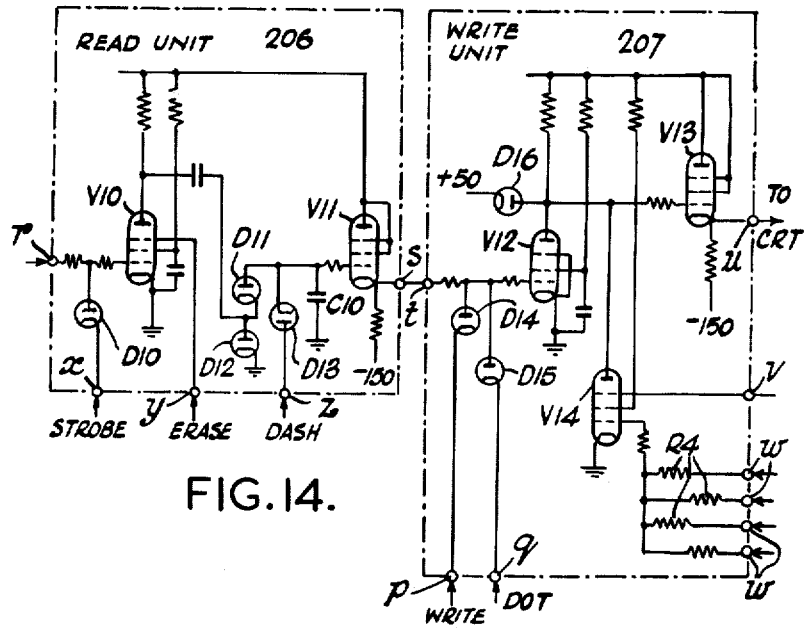
Figs. 14 and 15 illustrate more detailed circuit arrangements of the read and write units and of the Y-shift generator used in the cathode ray type storage devices.

Referring now to Fig. 14 each read unit 206 has its signal input terminal $r$ connected to the control grid of a first pentode valve V10 arranged as an amplifier and feeding its anode output by way of clamping diodes D11, D12 to the control grid of a second valve V11 arranged as a cathode follower and having its cathode connected to read output terminal $s$. The control grid of valve V10 is supplied with the Strobe waveform (Fig. 8c) through terminal $x$ and diode D10. The suppressor grid of valve V10 is connected to an erase terminal $y$ which is normally held at earth potential but which can, when erasure is necessary, be supplied with a negative potential sufficient to cut off the valve at its suppressor grid. The control grid of valve V11 is supplied with the Dash waveform (Fig. 8a) through diode D13 and is shunted to earth by condenser C10.

The operation of this circuit is as described in reference B, valve V10 being turned on only when a positive-going pulse of the Strobe waveform coincides with a positive-going pulse ("1"-indicating signal) from the amplifier 205 thereby producing, under these conditions, a negative-going anode output which is applied momentarily to the grid of the valve V11 to drive the latter negative and to charge condenser C10. This momentary pulse coincides with the commencement of the negative Dash pulse and thereafter the latter serves to hold the control grid of valve V11 at its negative level until the end of the Dash pulse whereupon the grid of the valve returns to its normal earthed level. The resultant output at the read output terminal $s$ is a Dash pulse for each "1"-indicating input signal from the amplifier.

The write unit 207 comprises a valve V12 whose control grid is connected to the input terminal $t$ and also by way of diode D14 to the external write input terminal $p$ and by way of diode D15 to the terminal $q$ which is supplied with the Dot waveform. Valve V12 is arranged as a conventional amplifier and has its anode directly connected to the control grid of cathode follower valve V13 whose cathode is connected to the output terminal $u$ which is connected, in turn, to the beam control electrode of the associated cathode ray tube. The operation of this write unit is also described in reference B, the Dot waveform normally serving to cut off valve V12 during the period of each Dot pulse thereby producing a positive-going Dot pulse output for modulating the tube beam unless there is a coincident Dash pulse arriving from the read unit 206 or through terminal $p$ when the valve is held cut off over the extended Dash pulse period. The resultant output at the anode then serves to provide a positive-going Dash pulse output at the output terminal $u$ to hold the beam of the cathode ray tube turned on for the period of the Dash pulse.

Valve V14 is the blackout valve provided for the purpose of effecting selection of any required one of the plurality of different cathode ray tubes stores. This valve has its anode connected to the interconnected control grid of valve V13 and anode of valve V12. The suppressor grid of valve V14 is connected to terminal $v$ and its control grid to each of four terminals $w$ by way of separate leak resistors R4.

Figure 15:
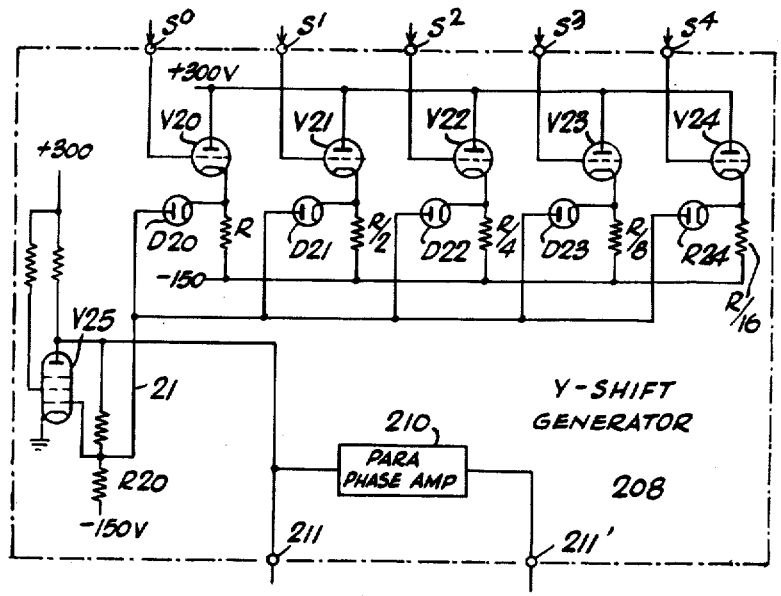

The Y-shift generator 208, shown in greater detail in Fig. 15, comprises 5 triode valves V20, V21, V22, V23, V24 each having their control grids connected respectively to separate controlling input terminals $s0$, $s1$, $s2$, $s3$ and $s4$ and having their anodes interconnected and joined to source of positive potential $+300$ v. The cathode of each valve is connected through a load resistance to a source of negative potential $-150$ v. and the values of these resistances are so graded that, whereas the first valve V20 load resistance has value R ohms, the second valve V21 has one of the value $R/2$ ohms, the third valve V22 one of $R/4$ ohms, the fourth valve V23 one of $R/8$ ohms and the fifth valve V24 one of $R/16$ ohms. The cathode of each of the valves is connected by way of an individual diode D20 . . . D24 to lead 21 leading to a tapping point of a resistive network R20. One end of this network is connected to the anode of a shift valve V25 whereas the opposite end is connected to the source of negative potential $-150$ v. The shift valve V25 is a pentode amplifier arranged as an anode follower and the operation of the circuit is substantially as that described in reference B whereby, according to the combination of valves V20 . . . V24 which are rendered conductive and non-conductive by their respective control grid inputs, so current flow through the resistance network R20 is varied according to a predetermined number of steps to provide a chosen one out of 32 different voltage levels at the Y-shift output terminal 211. In the usual way an antiphase version of this Y-shift potential is provided at terminal 211' by means of paraphase amplifier 210.

Returning now to Fig. 2 the erase terminals $y$ of all of the read units 206 are supplied, over lead 15, with the A4 waveform through gate G235 which is controlled by a code signal consequent upon the staticisor sections which deal with the F or function digits of the instruction having a particular setting. Such code signals, which are used extensively in the machine and are indicated on the drawings by the legend "F digit code," are derived from a circuit resembling the gate shown in Fig. 12, the various input terminals $f$, $g$, $h$ . . . being connected to the appropriate "1" or "0" terminals of the F trigger circuits, Fig. 4, so that a negative gate operating potential is obtained only when the F digits of the instruction have one particular configuration. In addition, such erase terminals $y$ can also be supplied continuously with a negative potential by closure of manual switch SW2.

Each terminal $v$ of the write units 207 is supplied with the combined S1 and S2 waveforms while each of the terminals $w$ of such write units is connected to the output terminals of a separate group of three gates G220 . . . G222, G223 . . . G225, G226 . . . G228 and G229 . . . G231. One gate of each group, G220, G223, G226 and G229 is controlled by the combined A1, A2 waveforms; these gates are supplied respectively with the "1" outputs of trigger circuits E5, E6, E7 and E8 (Fig. 4) to be described later. The second gate of each group, G221, G224, G227 and G230 is similarly controlled by the A3 waveform and supplied respectively with the "1" output from trigger circuits E14, E15, E16, E17 while the third gate of each group, G222, G225, G228 and G231 is controlled by the A4 waveform and supplied respectively with the "1" output from trigger circuits E23, E24, E25 and E26. Although the other tubes with their read and write units are not shown, their related terminals $w$ are assumed connected in parallel over conductor group 13.

Figure 4:
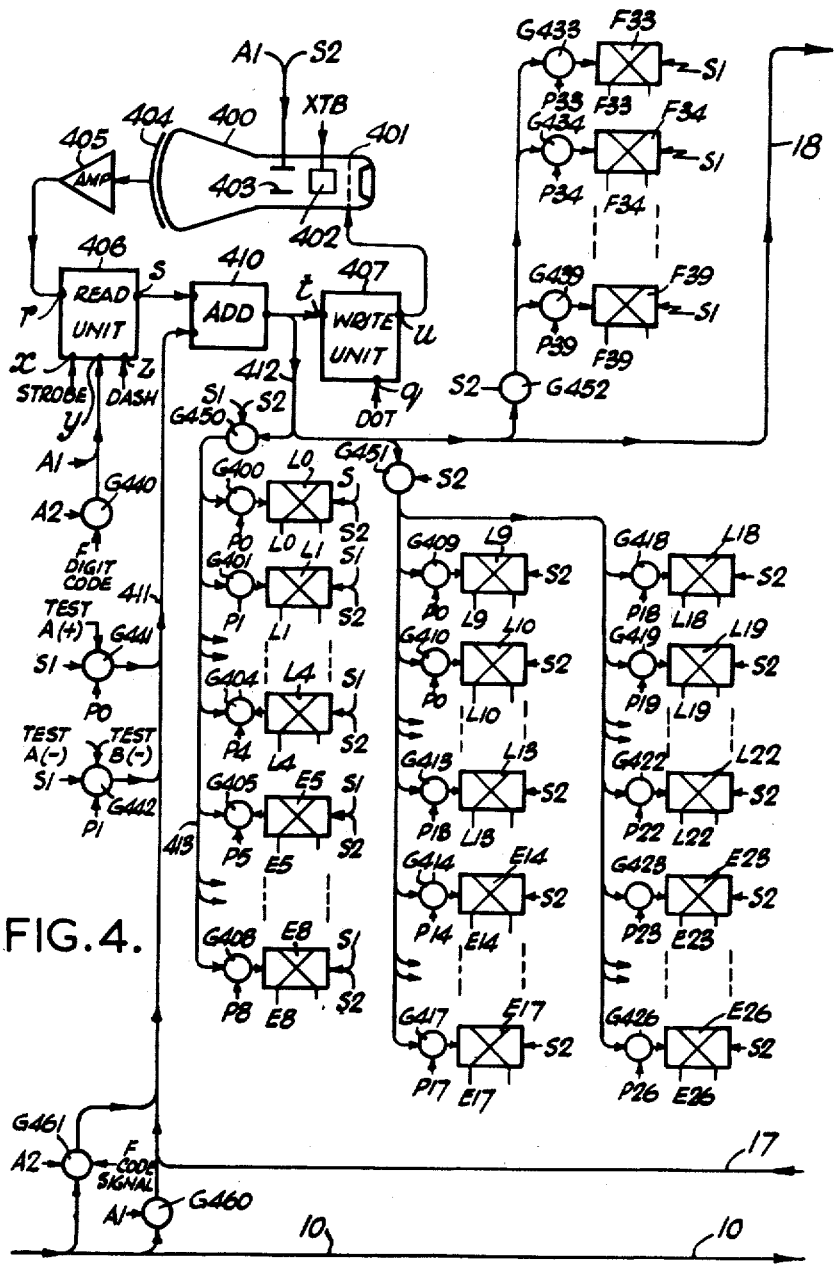

The control terminal $s0$ of the Y-shift generator 208 is connected to the output terminals of a group of four gates G200, G205, G210 and G215 controlled respectively by the combined S1, S2, the combined A1, A2, the A3 and the A4 waveforms. These gates are supplied respectively with the "1" outputs from trigger circuit C0 (Fig. 1) and L0, L9, L18 (Fig. 4). The second control terminal $s1$ is similarly supplied through a second group of four gates G201, G206, G211 and G216 having the waveform inputs indicated on the drawing while the remaining control terminals $s2$, $s3$ and $s4$ are likewise supplied from their respective groups of four gates G202, G207, G212 and G217, G203, G208, G213 and G218 and G204, G209, G214 and G219. The Y-shift potentials, similar for each tube, are supplied to all tubes in parallel over leads 12.

Figure 3:
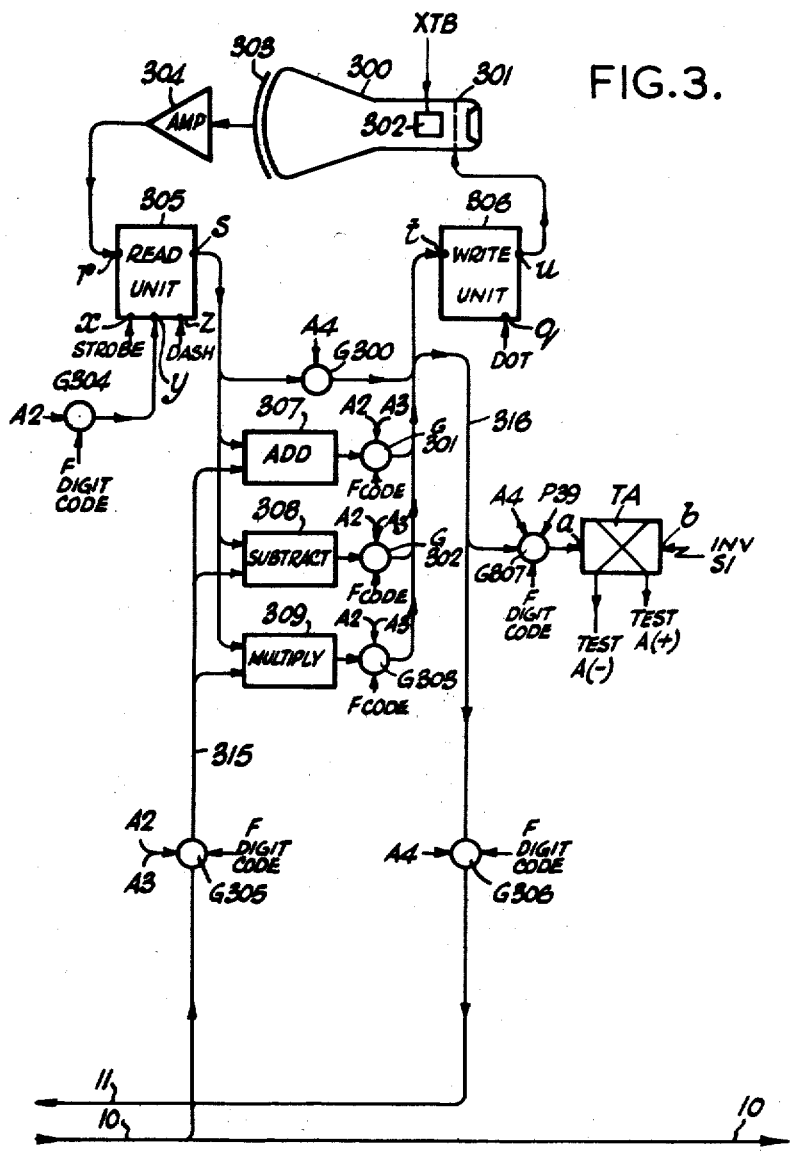

The arithmetic organ or accumulator of the machine is shown in Fig. 3 and includes a single tube cathode ray store comprising tube 300 with beam control electrode 301, X deflection plates 302, and signal pickup 303. The latter is connected through amplifier 304 to terminal $r$ of read unit 305 which is identical with that shown in Fig. 14 while the beam control electrode 301 is supplied with the output from terminal $u$ of write unit 306 which is substantially similar to that already described with reference to Fig. 14 except that it is not provided with the blackout valve V14 and its associated control terminals $v$ and $w$ since only one tube is involved and no selection is necessary. The regenerative loop between terminal $s$ of read unit 305 and terminal $t$ of write unit 306 is completed by way of any chosen one of four different paths. One path is a direct connection through gate G300, another is by way of an adder device 307 and gate G301, a third is by way of a subtractor device 308 and gate G302 and a fourth is by way of a multiplying device 309 and gate G303.

The gate G300 is controlled by the A4 waveform to be open only during beat A4 while the remaining gates G301, G302 and G303 are each controlled by the combination of the A2 and A3 waveforms and a particular function digit code signal whereby either the adder, the subtractor or the multiplier may be used, according to the nature of the instruction, during beats A2 and A3.

The second input to the adding, subtracting and multiplying units 307, 308 and 309 is by way of lead 315 from the read out busbar 10 of the main store through gate G305 which is likewise controlled by the combined A2 and A3 waveforms and a particular function digit code signal of an instruction calling for use of the accumulator. The erase terminal $y$ of read unit 305 is supplied with the A2 waveform through gate G304 which is also controlled by a particular function digit code signal so that, when required, the read unit may be rendered inoperative during the A2 beat for the purpose of clearing the store.

The input to terminal $t$ of write unit 306 is also supplied by way of lead 316 and gate G306 to the write input busbar 11 of the main store. Gate G306 is controlled by the A4 waveform and a particular function digit code signal whereby during beat A4 the output signal from gate G300, then alone operative, may be fed to the main store.

Also connected to the aforesaid lead 316 is a gate G307 controlled by the A4, P39 waveforms and a particular function digit code signal. This gate supplies the triggering input terminal $a$ of a trigger circuit TA (Test A) whose reset terminal $b$ is supplied with the differentiated INV S1 waveform. This trigger circuit supplies through its "1" output terminal $d$ the Test A (—) and through its "0" output terminal $e$ the Test A (+) signals. The trigger circuit is set into its triggered state only in the event of there being a "1" digit in the last, i.e. P39, digit interval of the output signal. This is indicative that the number is of negative sign and provides a test output signal accordingly.

As only one storage line is used in this accumulator no Y-plate deflection is necessary and no Y-plates are shown. The tube beam sweeps continuously over the single storage line during each beat.

The adding, subtracting and multiplier devices can be of any convenient one of the now well known kinds which are capable of accepting two simultaneously applied number-representing pulse signal trains and providing a similar answer-representing pulse signal train form of output. Such devices are discussed and described in the publications of the art including "High Speed Computing Devices" by E. R. A. (McGraw-Hill), 1950, and "Calculating Machines and Instruments" by D. R. Hartree (University of Illinois Press), 1949.

The control unit of the machine is shown in Fig. 4 and comprises a single cathode ray storage tube 400 having beam control electrode 401, X deflection plates 402, Y deflection plates 403 and a signal pick-up plate 404. The latter is connected to the input of an amplifier 405 whose output is supplied to the terminal $r$ of a write unit 406 similar to that shown in Fig. 14. The output terminal $s$ of the latter is connected to one signal input terminal of an adding device, of a form similar to that of device 307 of the accumulator, whose output terminal is connected to the input terminal $t$ of write unit 407. The latter is similar to that of unit 306 of the accumulator and has its output terminal $u$ connected to the beam control electrode 401 of the tube 400 in the usual way so as to complete the regenerative loop. A second input to the adding device 410 over lead 411 is by way of gate G460 from the read out busbar 10 of the main store. Gate G460 is controlled by the A1 waveform to be open only during beat A1. Another input to the same second input terminal of the adding device 410 is by way of gate G461 which is controlled by the A2 waveform and a particular function digit code signal whereby, upon the requirement of a particular instruction, a number can be fed from the main store to the control tube 400 during beat A2. Further inputs to the same second input terminals are by way of gate G441 controlled by the P0, S1 waveforms and the Test A (—) signal (Fig. 3) and by way of gate G442 controlled by the P1, S1 waveforms and the combined Test A (—) and Test B (—) signals. The last mentioned signal will be described later.

The X deflection plates 402 are supplied with the XTB waveform while the Y deflection plates 403 are supplied with the combined A1 and S2 waveforms whereby the tube beam scans two 40-digit storage lines, one of these, that which registers the control instruction or CI number, being scanned during beats S1 and A2, A3 and A4 and the other, that which registers the present instruction or PI number being scanned during beats A1 and S2.

The erase terminal $y$ of read unit 406 is supplied continuously with the A1 waveform so as to inhibit the regenerative loop during every A1 beat and is also supplied with the A2 waveform through a gate G440 which is controlled by a particular function digit code signal whereby the regenerative loop can also be inhibited during beat A2 if called for by a particular instruction word.

The output terminal of the adding device 410 is also connected by way of lead 412 to gate G450. This gate is controlled by the S1 and S2 waveforms to be opened only during beats S1 and S2 and its output is supplied over lead 413 as a triggering input to each of 9 two-stable-state trigger circuits L0, L1 . . . L4, E5 . . . E8 by way of individual control gates G400 . . . G408, each controlled respectively by the P0, P1 . . . P8 waveforms. Each of these trigger circuits is arranged to reset at the beginning of each S1 and S2 beats by application of the combined and differentiated S1 and S2 waveforms to their respective resetting terminals. By the action of the individual gates G400 . . . G408, these trigger circuits will be turned on or will not be turned on at the beginning of each S1 and S2 beat in accordance with whether the related digit interval P0 . . . P8 of the CI or PI signal does or does not contain a "1"-representing pulse. The respective "1" terminal outputs from the trigger circuits L0 . . . L4, E5 . . . E8 will be referred to as the L0, L1 . . . L4, E5 . . . E8 outputs and are applied to the various gates of Fig. 2.

Two further and similar series of 9 two-stable-state trigger circuits L9 . . . L13, E14 . . . E17 and L18 . . . L22, E23 . . . E26 are supplied with the same output from the adding device 410 on lead 412 by way of gate G451 controlled by the S2 waveform. These trigger circuits have individual gates G409 . . . G417 and G418 . . . G426 in their triggering input leads controlled respectively by the P9 . . . P17 and P18 . . . P26 waveforms; each trigger circuit is reset at the beginning of each S2 beat by the differentiated S2 waveform. These trigger circuits will thus be turned on or will not be turned on during each S2 beat in accordance with the presence or absence of a "1"-representing pulse in the related digit intervals of the signal train supplied thereto during beat S2. Their respective "1" terminal outputs are known as the L9 . . . L13, E14 . . . E17, L18 . . . L22, E23 . . . E26 outputs and are also used to control the gates shown in Fig. 2.

In similar manner a further series of 7 two-stable-state trigger circuits F33 . . . F39 have their triggering input terminals supplied by way of individual gates G433 . . . G439 from lead 412 by way of gate G452 controlled by the S2 waveform. These individual gates G433 . . . G439 are controlled by the P33, P34 . . . P39 waveforms and the trigger circuits are each supplied at their resetting terminals with the differentiated S1 waveform. In similar manner to the previous trigger circuits L9 . . . E14 . . . , this group of trigger circuits will be set up in accordance with the configuration of the digits P33 . . . P39 of the signal train supplied through gate G452 in beat S2. These trigger circuits F33 . . . F39 constitute the staticisor sections controlled by the function digits of each instruction and their respective outputs are used inter alia for providing the various function digit code signals through decode circuits as already described.

The output from the adding device 410 on lead 412 is also supplied by way of lead 18 to the B tube arrangements which will be described hereinafter while a modifying signal from such B tube arrangements is supplied to the second input terminal of the adder device 410 by way of lead 17.

Figure 5:
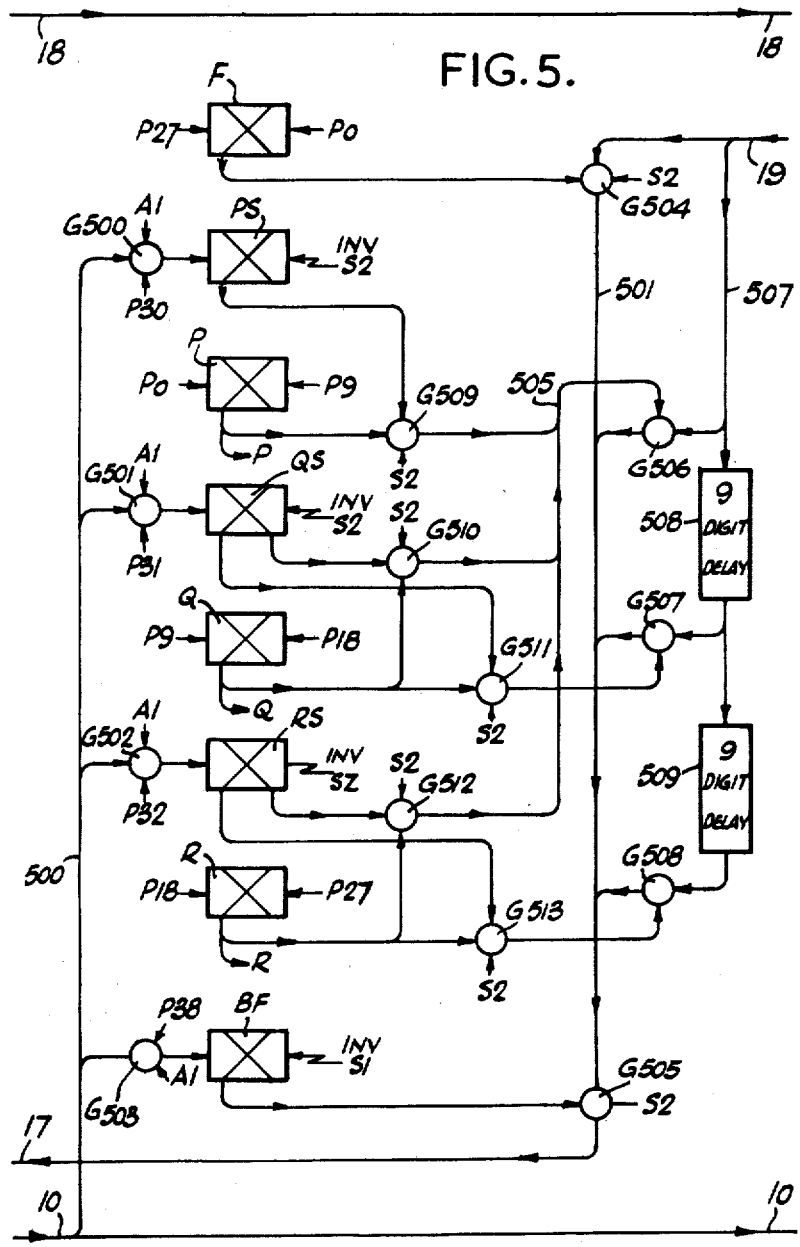

Fig. 5 illustrates certain control circuits for the B tube arrangements. These comprise a function detector G503 consisting of an "and" gate supplied from the main store read output busbar 10 and controlled by the A1 and P38 pulse waveforms. This gate supplies a triggering input to a two-stable-state triggering circuit BF whose resetting terminal is supplied with the INV S2 waveform. When in its triggered condition this trigger circuit supplies a gate opening potential from its "1" output terminal to gate G505 which is also controlled by the S2 waveform and is in a lead 501 which connects the read output lead 19 of the B tube store (Fig. 6) to the lead 17 previously referred to as connected to the adding device 410 of the control tube (Fig. 4). This lead 501 also includes a gate G504 controlled by the S2 waveform and by the "1" terminal output of a trigger circuit F whose input triggering terminal is supplied with the P28 pulse waveform and whose reset terminal is supplied with the P0 pulse waveform.

A two-stable-state trigger circuit PS has its input triggering terminal connected by way of gate G500 to the main store read output busbar 10. The gate G500 is controlled by the A1 waveform and by the P30 pulse so that it is triggered in the event of a "1" pulse occurring in the P30 position of a signal during beat A1. The trigger circuit PS is reset by the differentiated INV S2 waveform applied to its resetting terminal. When in its on condition this trigger circuit supplies a negative gate opening potential to a gate G509 which is also controlled by the S2 waveform.

A trigger circuit P, supplied at its triggering input terminal with the P0 pulse waveform and at its resetting terminal with the P9 pulse waveform, has its "1" output terminal connected to the said gate G509, the output from the latter being applied by way of lead 505 to a further gate G506. The same "1" output from trigger circuit P is available as the P waveform and is shown in Fig. 8h.

A further trigger circuit QS has its triggering input terminal connected by way of gate G501 to the main store read output busbar 10. The gate G501 is controlled by the A1 waveform and by the P31 pulse waveform while the resetting terminal of the trigger circuit is supplied with the INV S2 waveform. The "0" output terminal of this trigger circuit is connected by way of a gate G510 to the same conductor 505 leading to gate G506. The gate G510 is also controlled by the S2 waveform and by the "1" output of a further trigger circuit Q whose triggering input terminal is supplied with the P9 pulse waveform and whose resetting terminal is supplied with the P18 pulse waveform. The "1" output from this trigger circuit Q, in addition to application to gate G510, is also available as the Q waveform, Fig. 8i, and is applied to a further gate G511 which is controlled by the S2 waveform and by the "1" output of the trigger circuit QS. The output from this further gate G511 is applied as a controlling input to a gate G507 referred to later.

A further trigger circuit RS has its triggering input terminal connected by way of gate G502 to the main store read output busbar 10. The gate G502 is controlled by the A1 waveform and by the P32 pulse waveform. The resetting terminal of the trigger circuit RS is supplied with the differentiated INV S2 waveform. The "0" output of trigger circuit RS is supplied through a gate G512 to the same lead 502 leading to gate G506. Gate G512 is controlled by the S2 waveform and by the "1" terminal output from a further trigger circuit R whose triggering input terminal is supplied with P18 pulse waveform and whose resetting terminal is supplied with the P27 pulse waveform. The "1" terminal output of such trigger circuit R is available as the R waveform, Fig. 8j, and is additionally applied through gate G513 as a controlling input to a further gate G508. The gate G513 is supplied with the S2 waveform and also with the "1" terminal output of the trigger circuit RS.

The read output lead 19 from the B tube store (Fig. 6) is connected, as already stated, through gate G504, lead 501 and gate G505 to the lead 17 leading to the control tube added device. In addition, lead 19 is connected by way of lead 507 and gate G506, previously referred to, to lead 501 and is further connected to the input terminal of a 9-digit interval delay circuit 508. The output from the latter is supplied to the lead 501 through gate G507, already referred to, and is additionally applied to the input terminal of a further 9-digit interval delay device 509. The output from the latter is also supplied to the lead 501 by way of gate G508 already referred to.

The 9 digit interval delay devices 508, 509 can be of any convenient form, e.g. a suitable electrical or acoustic delay line device, or more conveniently may comprise a serial arrangement of trigger circuits connected to form a stepping register as is well known in the art.

Figure 6:
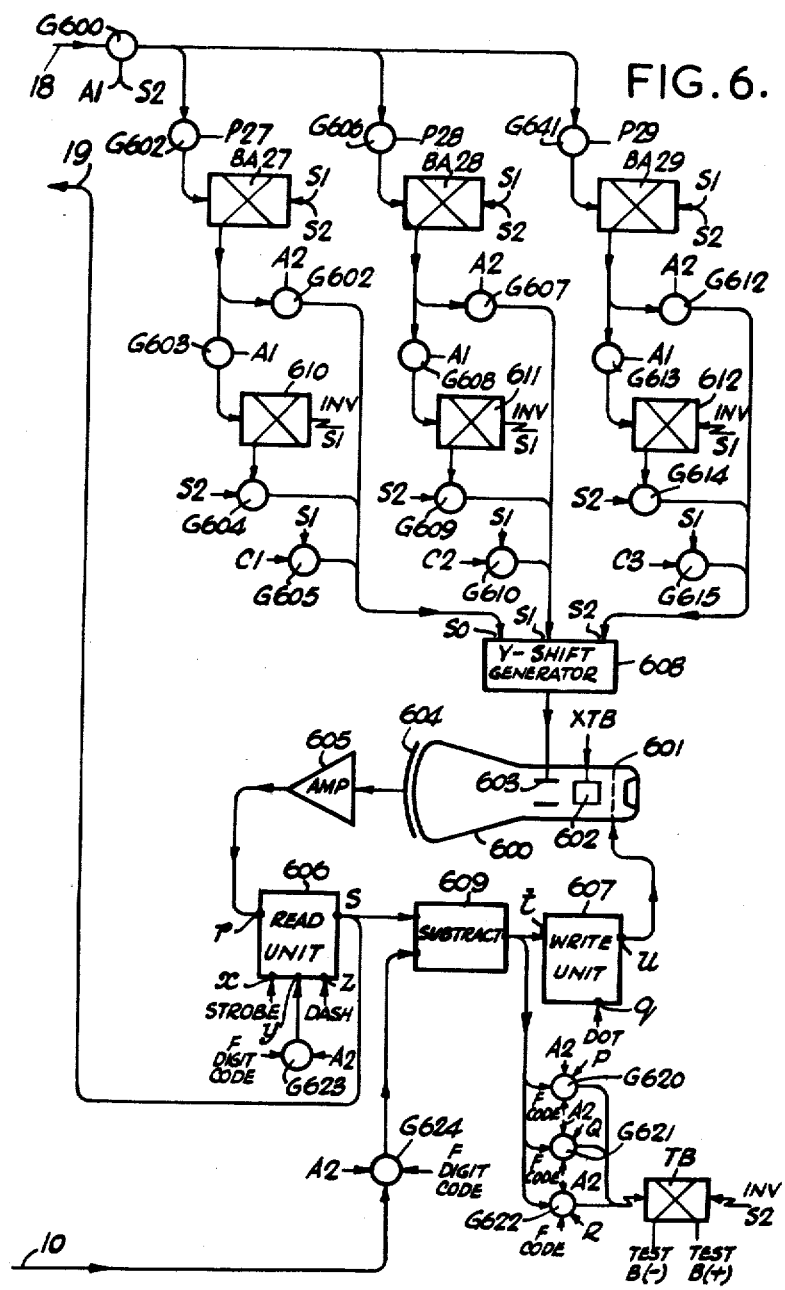

The B tube arrangements of the machine are shown in Fig. 6 and comprise a single cathode ray storage tube 600 having beam control electrode 601, X deflection plates 602, Y deflection plates 603 and a signal pick-up plate 604. The latter is connected by way of an amplifier 605 to the signal input terminal r of read unit 606 whose form is as shown in Fig. 14 and whose read output terminal s is connected to one input of a subtractor device 609, the output terminal of which is connected to the signal input terminal t of a write unit 607. The latter is similar to those of the accumulator and control tube circuits and has its output terminal u connected to the beam control electrode 601 of the tube 600 in the usual way to complete the regenerative loop. The second input of the subtractor device 609 is supplied by way of gate G624 from the main store read output busbar 10. The gate G624 is controlled by the A2 waveform and by a particular function digit code signal. The erase terminal y of the read unit 606 is supplied with the A2 waveform through gate G623 controlled by a function digit code signal.

The read output from terminal s of the read unit 606 is also supplied by way of lead 19 to B tube control circuits as already described with reference to Fig. 5.

The B tube has 8 separate 40-digit storage lines and selection of these is governed by the potentials applied to the Y deflection plates 603 from a Y-shift generator 608 whose form is similar to that already referred to in connection with Fig. 15, except that it has only three controlling input terminals s0, s1 and s2 and only three of the five valves (V20, V21, V22) previously shown with their associated circuit elements. It thereby provides 8 different scanning levels. The X deflection plates of the tube are supplied with the XTB waveform in the usual way.

The input lead 18 from the control unit (Fig. 4) is connected through gate G600, controlled by the combined A1, S2 waveforms, to the triggering input of each of three two-stable-state trigger circuits BA27, BA28 and BA29 by way of individual control gates G602, G606 and G611. Each of these control gates is controlled respectively by the P27, the P28 and the P29 pulse waveforms. Each of the trigger circuits is supplied at its resetting terminal with the combined and differentiated S1 and S2 waveforms.

When trigger circuit BA27 is in its triggered or on state it supplies a negative gate opening potential to gate G602 which is controlled by the A2 waveform and to a further gate G603 which is controlled by the A1 waveform. The output from gate G602 is connected directly to the control input terminal s0 of the Y-shift generator 608 while the output from gate G603 is applied as a triggering medium to a two-stable-state trigger circuit 610 whose reset terminal is supplied with the INV S1 waveform. The "1" terminal output of this trigger circuit is applied through gate G604, controlled by the S2 waveform, to the same control input terminal s0 of the Y-shift generator 608. The remaining trigger circuits BA28 and BA29 are each associated with similar gates G607, G608, G609 and G612, G613, G614 and trigger circuits 611, 612 controlling the input potentials to terminals s1 and s2 of the Y-shift generator 608. In view of their similarity they will not be further referred to.

In addition to the above, the control terminals s0, s1 and s2 are supplied respectively with the C1, C2 and C3 waveforms by way of gates G605, G610 and G615 each controlled by the S1 waveform so as to be open only during the S1 beat.

The output terminal of the subtractor device 609 is also connected to one input terminal of each of three gates G620, G621 and G622 whose outputs are combined and applied as a triggering input to a two-stable-state trigger circuit TB. Each gate is also controlled by the A2 waveform and by a different function digit code signal and by the P, Q and R waveforms respectively. The trigger circuit is supplied at its reset terminal with the INV S2 waveform and provides, at its "1" output terminal, the Test B (—) signal and at its "0" output terminal, the Test B (+) signal. The Test B (—) signal is used to control gate G442, Fig. 4.

The normal operation of the machine will first be outlined, the use of B tube facilites being ignored for the present. Assuming that the various repetitive waveforms are being continuously generated an operative bar is commenced by the release of a Prepulse signal through the gate G101, Fig. 1, because the switch SW1 is closed and the various controlling waveforms are all continuously negative-going. Such prepulse will initiate the cycle of operation of the chain of trigger circuits 150, 151 . . . 155, Fig. 1, to generate in succession the S1, A1 . . . A4 beat waveforms, Figs. 9d to 9i.

During the first beat S1, gate G441, Fig. 4, is opened to release a P0 pulse to the adder device 410 of the control tube 400 (the Test A (+) signal is normally negative). During this beat, the beam of tube 400 is scanning the CI line and the existing CI number, e.g. 101001000 (reading from left to right and indicating line 5 in tube 1), see Fig. 8k, is read out through the read unit 406 and is increased in value by 1, e.g. to 011001000 . . . (indicating line 6 in tube 1), in the adder device 410. The new CI number is then reinserted in the place of the old on the same CI line of tube 400. At the same time this new CI number will be applied over lead 412 and through gate G450, which is open during this beat, to each of the 9 trigger circuits L0 . . . L4 and E5 . . . E8 through their related control gates G400 to G408 whereby such trigger circuits will be set up according to the configuration of the respective P0 . . . P8 digits of the CI number. That is to say, with the example quoted above, trigger circuits L1, L2 and E5 will be turned on and the rest left turned off. At the end of the beat such trigger circuits will be in readiness to control the Y-shift generator 208 and the write units 207 of the main store, Fig. 2, through gates G205 . . . G209 and G220, G223, G226 and G229 to render operative, during the next following beat A1, the selected tube containing the next present instruction and to align the beam of that selected tube with the storage line for that particular instruction.

In the meantime, in the same beat S1, one of the storage lines in each of the main store tubes 200 is being regenerated by the application of the appropriate combination of counter waveforms C0 . . . C4 through the related gates G200 . . . G204 supplying the control input terminals s0, s1 . . . s4 of the Y-shift generator 208. This is in a manner analogous to that described in the aforesaid reference B. Every tube 200 is operative at this time as the S1 waveform applied to terminals v of each write unit 207 cut off the associated blackout valve, V14 (Fig. 14).

In the next beat A1, the selected or presumptive instruction (PI) which is next to be obeyed by the machine is read out from the selected tube 200 of the main store. Selection of the required tube is effected by the application of the various potentials from the four trigger circuits E5 . . . E8, Fig. 4, to the gates G220, G223, G226 and G229 Fig. 2 which are opened during this beat and which govern the supply of controlling potentials through terminals w to the various blackout valves V14 (Fig. 14) of each of the write units 207 of the different storage tubes 200 of the main store so that only one blackout valve is cut off and only one tube is rendered operative during such A2 beat. The line containing the PI instruction word is rendered operative by the application of the appropriate combination of potentials from the trigger circuits L0 . . . L4, Fig. 4 to the gates G205 . . . G209, Fig. 2, which are open during this A1 beat and which now supply the requisite control potentials to the controlling input terminals s0 . . . s4 of the Y-shift generator 208. The selected PI word is thus regenerated by passage through the read unit 206 and write unit 207 of the selected tube and is, at the same time, read out to the main store output busbar 10 through buffer B200.

This selected PI word, such as that shown in Fig. 8m, is fed through the now-open gate G460, Fig. 4, to the adding device 410 of the control unit. The control tube 400 is, at this time, operating on the other PI line due to the application of the A1 waveform to its Y-deflection plates 403 while the erase terminal y of the read unit 406 of the control tube is supplied with the negative-going A1 waveform to inhibit the regenerative loop whereby the old contents of the PI line are blocked from passage through the read unit and the new PI number arriving on lead 411 is the only input to the adder device 410. In consequence the old PI number is erased and the new PI number is inserted in its place.

In the next beat S2, the PI number stored in the PI line of the control tube 400, Fig. 4, is regenerated by passage through the read unit 406, adder device 410 and write unit 407 (there being no input to the adder device 410 at this time) and in addition, is applied over lead 412 and through gates G450, G451 and G452 to each of the trigger circuit groups L0 . . . L4, E5 . . . E8; L9 . . . L13, E14 . . . E17; L18 . . . L22, E23 . . . E26 and F33 . . . F39. All of the trigger circuits of the first group L0 . . . L4, E5 . . . E8 were reset to zero at the very beginning of this particular beat by the S2 waveform applied to their resetting terminals. In consequence, at the end of beat S2 all of such trigger circuits will be set up according to the configuration of the related digits of the applied PI word. In the meantime the main store, Fig. 2 is again regenerating on the next line of its systematic regeneration cycle by reason of the further opening of gates G200 . . . G204 by the S2 waveform and the concurrent application of the related counter waveforms C0 . . . C4. The latter will have changed slightly by reason of the reversal of at least the first circuit 160 of the chain of trigger circuits 160 . . . 164, Fig. 2 by the input thereto from gate G150. As in beat S1 all of the storage tubes of the main store are operative at this time for internal regeneration by reason of the application of the S2 waveform to the suppressor grid of the blackout valve of each write unit 207 through the related terminal $v$.

In the next beat A2, the group of trigger circuits L0 . . . L4, E5 . . . E8, Fig. 4 (which have been set up in accordance with the configuration of the P address digits (Fig. 8$m$) of the PI word in digit intervals P0 . . . P8 thereof) will be rendered effective upon the controlling inputs to the Y-shift generator 208 of the main store and the tube selecting control terminals $w$ of each of the write units 207 of such store. The L digit trigger circuits L0 . . . L4 will be effective upon the Y-shift generator 208 through gates G205 . . . G209 respectively whereas the tube selecting arrangements will be controlled by the E digit trigger circuits E5 . . . E8 through gates G220, G223, G226 and G229 respectively. One selected tube in the main store is thus rendered operative according to the E digits of positions P5 . . . P8 of the PI word while a particular line of that selected tube is scanned in consequence of the L digits P0 . . . P4. The selected number word at this address P is regenerated through the read and write units 206, 207 of the selected tube and is simultaneously passed to the main store read output busbar 10 through the buffer B200.

At the same time the various trigger circuits of the group F33 . . . F39, which have been set according to the configuration of the F digits of the PI word, simultaneously control, through the requisite decoding circuits, the various transfer gates throughout the machine according to the type of operation which is called for by the particular instruction. For simplicity, it will be assumed that this instruction is the one of effecting a transfer of one number from the main store to the accumulator, followed by the transfer of another number from the main store to the accumulator and its addition therein to the first and then the transfer of the answer number back to the main store. In this case the F digit code will be such that the gate F305, Fig. 3, is opened so that the read out number word on the main store output busbar 10 is fed through the adding unit 307 and gate G301 to the input terminal $t$ of the write unit 306 of the accumulator tube 300. No output is received from the read unit 305 in this beat owing to the simultaneous opening of gate G304 to allow the A2 waveform to stimulate the erase terminal $y$ of the read unit 305. At the end of beat A2 the number previously in the address P of the main store is thus read out and transferred to the storage line of the accumulator tube 300.

During the next beat A3, the setting of the first or P group of address trigger circuits L0 . . . L4, E5 . . . E8, Fig. 4, is rendered inoperative upon the main store and is replaced by the setting of the second group of trigger circuits L9 . . . L13, E14 . . . E17. This is effected by the closure of the gates G205 . . . G209 and G220, G223, G226 and G229, Fig. 2, due to the termination of the A2 waveform and the opening of gates G210 . . . G214 and G221, G224, G227 and G230, Fig. 2, by the presence of the A3 waveform. Thus the L digits of the Q address section of the PI word (see Fig. 8$m$) become effective respectively upon the five controlling input terminals $s0$ . . . $s4$ of the Y-shift generator 208, Fig. 2, while the E digits of the same Q address become effective upon the various blackout valves V14 (Fig. 14) of the write units 207 of the different main store tubes. In consequence one particular tube will be selected for operation and one particular line in that tube will be scanned during beat A3.

The content of the chosen (second) address, i.e. the second number signal is thus regenerated around the regenerative loop of the selected tube and is also read out during this beat A3 to the main store output busbar 10 through buffer B200 and is also applied through gate G305, Fig. 3, which is still open, to the adding device 307, the latter being still made operative by the continued opening of the gate G301 associated therewith. Simultaneously, the previously inserted number word already within the accumulator tube 300 is regenerated and is fed from the read unit 305 to the other input terminal of the adder 307 whereby a sum-representing output signal is supplied to the input terminal $t$ of the write unit 306 and is reinserted in the accumulator storage line in place of the original number.

In the final beat A4, the control of the address selection within the main store is again transferred from the trigger circuit group L9 . . . L13, E14 . . . E17 to the trigger circuit group L18 . . . L22, E23 . . . E26, Fig. 4. This is effected by the closure of gates G210 . . . G214, G221, G224, G227 and G230 due to the termination of the A3 waveform and the opening of gates G215 . . . G219, G222, G225, G228 and G231 due to the presence of the A4 waveform. As a result, the E digits of the third or R address section of the PI word, Fig. 8$m$, become effective upon the various blackout valve control terminals $w$ of the various write units 207 of the main store whereby one selected tube only is rendered operative while the L digits of such R address section similarly become effective upon the five controlling input terminals $s0$ . . . $s4$ of the Y-shift generator 208 to select the appropriate storage line in the selected tube.

During this beat the gate G300 in the regenerative loop of the accumulator store, Fig. 3, is opened to permit direct regeneration and the output from the read unit 305, in addition to being applied to the write unit 306 for reinsertion into the accumulator storage line, is also fed out over lead 316 and through gate G306, now opened by the A4 waveform (under the assumed function digit code calling for transfer of the sum-representing number back to the main store) and is fed from such gate to the main store input busbar 11 for passage to the write input terminal $p$ of the write unit of the operative main store tube. In order to provide for the erasure of any existing content in the selected storage line of such main store tube the A4 waveform is applied through gate G235 to the erasure terminal $y$ of the read unit 206 when the particular function digit combination requiring such erasure is set up on the F trigger circuits F33 . . . F39, Fig. 4. Thus at the end of beat A4 the sum-representing number has been obtained and has been located in a desired position within the main store.

Due to the fact that gate G101, Fig. 1, causing generation of the Prepulse waveform is now opened, as all its controlling inputs are negative-going, the next arriving B0 pulse occurring at the beginning of the next beat is allowed to issue as a Prepulse to initiate a further operative bar during which a similar cycle of operation is proceeded with, using the next available instruction stored within the main storage tube at the address denoted by the CI number which is again altered by the addition of 1.

The machine shown is of greatly simplified character for the purpose of achieving ease of description but the usual conditional transfer facilities are provided whereby, as a result of a testing operation, it is possible to alter the cycle of selection of present instruction numbers by increasing the CI number by some number other than 1. This is effected, on demand by a particular function digit code signal, by the opening during beat A4 of the gate G307 of the accumulator, Fig. 3, whereby the presence of a "1" digit pulse in position P39 of a signal read out on lead 316 indicating negative sign, causes triggering of the trigger circuit TA to set up the Test A (−) signal at its "1" output terminal in place of the previous Test A (+) signal at its "0" output terminal. This reversal of Test A output signals serves to close gate G441 (Fig. 4) and to open gate G442. In consequence during the next beat S1 a P1 pulse is emitted for addition to the CI number instead of the P0 pulse normally released through gate G441. The cycle of operations is then modified in a manner analogous to that described in the aforesaid reference A.

The modified manner of operation with the B tube facilities according to the present invention will now be described. During beat S1 the CI number is modified and is passed to the trigger circuits L0 . . . L4, E5 . . . E8 as before, the main store tubes 200 regenerating in the usual way. During beat A1, the selected PI number, in addition to being passed to the PI line of the control tube 400, Fig. 4, as already described, is also fed by way of lead 18 to the trigger circuits BA27, BA28 and BA29, Fig. 6, so that the presence of a "1" pulse in any of the digit positions P27, P28 or P29 of the present instruction, i.e. the B store address digits (see Fig. 8m), will cause the triggering of the related trigger circuit. This is due to the opening of gate G600 during the A1 beat and the control of related gates G602, G606 and G611 by the appropriate P-pulse waveforms. These trigger circuits are thus set up according to the configuration of the B address digits by the end of beat A1. At the same time the selected PI number on the main store output busbar 10 is applied to the B function detector gate G503, Fig. 5, whereby, in the event of the particular function digit P38 indicative of a requirement to use the B tube system being present, the trigger circuit BF will be turned on. Simultaneously the same PI number will be applied over lead 500 to each of the gates G500, G501 and G502 which are controlled by the B select digits P30, P31 and P32 (See Fig. 8m) so that one or more of these trigger circuits will be turned on according to the configuration of such digits.

The "1" output potentials from any one of the B tube address selecting trigger circuits BA27, BA28 and BA29 which has been turned on, is not made effective immediately upon the associated Y-shift generator 608 of the B tube, Fig. 6, but is applied during such beat A1 through gates G603, G608 and G613 to effect triggering of the associated trigger circuit 610, 611 or 612 so that the latter assume a setting similar to that of the trigger circuits BA27, BA28 and BA29. The trigger circuits BA27, BA28 and BA29 are reset at the beginning of the following beat S2 and during this beat the trigger circuit 610, 611 and 612 are caused to be effective upon the control terminals s0, s1 and s2 of the Y-shift generator 608 through the respective gates G604, G609 and G614 which are open during the S2 beat. The trigger circuits 610, 611 and 612 thus perform a holding or "shuffle" function to permit re-use of the trigger circuits BA27, BA28 and BA29 in the meantime. The known type of "shuffle" circuit making use of a charge-holding condenser in the control grid circuit of a valve can be used in place of the trigger circuits 610, 611 and 612.

During this beat S2, the appropriate storage line within the B tube 600 containing the required instruction-modifying or B-word, see Fig. 8n, for example, is thus selected and the B-word is read out from the read unit 606 over lead 19 to the B tube control circuits, Fig. 5

Assuming that the B requirement has been demanded by the selected PI word, the trigger circuit BF, Fig. 5, will have been turned on during the previous beat A1 and gate G505 opened. During this beat S2, gate G504 will be opened during the digit periods P27 . . . P39 by the output from the trigger circuit F so that that part of the arriving B-word signal on lead 19, at least, will be passed by way of gate G504, lead 501 and gate G505 to the lead 17 and thus to the adding device 410 of the control tube 400. Any modifying signals within this portion of the B word will thus be effective to modify the corresponding portion of the PI word which is read out through the read unit 406 of the control tube during beat S2 for application to the various trigger circuits by way of gates G450, G451 and G452 (Fig. 4) and G600 (Fig. 6).

The modification of the various address digit groups P, Q and R (Fig. 8m) of the PI word within the control tube 400, Fig. 4, by different portions, BP, BQ and BR of the B word (Fig. 8n), is governed by the operation of the B tube control circuits of Fig. 5 under the influence of the B select digits P30, P31 and P32 of the PI word (Fig. 8m).

If the PI word contains a "1" digit at position P30, indicating a requirement to modify the P address digits of the PI word with the BP digits of the B-word, trigger circuit PS, Fig. 5, will have been turned on during beat A1 by passage of the P30 pulse through gate G500 and in consequence gate G509 will be opened in beat S2 to allow the P waveform, Fig. 8h, comprising a negative pulse covering digit intervals P0 . . . P8, to pass therethrough to lead 505 and thus to open gate G506 during the same period thereby allowing the arriving BP digits of the B-word on lead 19 to pass by way of lead 507 and gate G506 to lead 501 and thence through gate G505 to lead 17 and the adder device 410 of the control tube to effect the required modification of the P digits of the PI word being passed out from the read unit 406 in synchronism therewith.

If, either instead of, or in addition to the above described operation, it is required to modify the Q address digits of the PI word with the same BP digits of the B word, then the PI word will include a "1" pulse in position P31 and in consequence trigger circuit QS, Fig. 5, will have been triggered during beat A1 by the passage of such P31 pulse through gate G501. The resultant negative output at the "1" terminal of trigger circuit QS causes gate G511 to be opened during beat S2 for the period of digit intervals P9 . . . P17 covered by the negative pulse of the Q waveform, Fig. 8i, generated by the trigger circuit Q. This output from gate G511 is applied to gate G507 to open the latter for the same period. The original BP digits arriving on lead 19 and passing by way of lead 507 to the 9-digit delay circuit 508, will emerge from the latter sufficiently delayed to synchronise with the digit intervals P9 . . . P17 and in consequence, will pass by way of the now opened gate G507 to lead 501 and through gate G505 to lead 17 and the adder device 410 of the control tube, Fig. 4, to modify the Q address digits of the PI word which are then emerging from the read unit 406.

If, either instead of, or in addition to any of the previous modification operations, it is required to modify the R address digits, Fig. 8m, by the same BP digits, Fig. 8n of the B word, then the PI word will include a "1" pulse in position P32. As a result of this, trigger circuit RS will have been turned on during beat A1 by the passage of the said P32 pulse through gate G502 and the "1" terminal output from the trigger circuit RS will allow gate G513 to be opened during the S2 beat for the period covered by the R waveform pulse, Fig. 8j, embracing digit intervals P18 . . . P26. This output pulse applied from gate G513 causes gate G508 to open during the same period. The original BP digits of the B word on lead 19, after passage over lead 507 and through the first and second 9-digit delay circuits 508, 509, will emerge from the latter in synchronism with the same period of digit intervals, P18 . . . P26 and will then be passed through gate G508 and gate G505 to lead 17 and thence to the adding device 410 of the control tube where they will operate to modify the R address digits of the PI word which will emerge from the read unit 406 of the same time.

Thus the arrangement provides a facility for permitting the digits of the B word corresponding with the first address digits P of the PI word to modify any one or any combination of the addresses P, Q and R of the PI according to the presence or absence of "1" digit pulses P30, P31 and P32 in the PI word. As will be appreciated by those with a knowledge of programming, such a facility is of wide application.

The arrangement shown also provides an equivalent to the standard B facility as already known, namely that of being able to modify the P address digits of the PI by the related BP digits of the B word, the Q address digits of the PI by the related BQ digits of the B word and the R address digits of the PI by the related BR digits of the B word. This requirement is signalled in the PI word merely by omitting "1" pulses from digit positions P31 and P32. Under such form of operation, the presence of a "1" digit at position P30 will cause operation of the trigger circuit PS and the subsequent allowance of the BP digits to pass through gate G506 in the manner already described. Subsequently, the fact that trigger circuit QS has not been turned on will cause gate G510 to be opened by the "0" terminal output from such trigger circuit, during the period of the Q waveform pulse provided by trigger circuit Q so as to apply a gate opening potential during the period of digit intervals P9 . . . P17 over lead 505 to gate G506. The opening of the gate G506 during this second or BQ digit period of the B word arriving on lead 19 allows such BQ digits to pass to lead 17 and the adding device 410 of the control tube to modify the Q address digits then emerging from the read unit 406.

In similar manner the absence of a "1" pulse at digit interval P32 of the PI word on lead 500 in beat A1 will leave trigger circuit RS turned off whereby its "0" terminal output will open gate G512 to pass the R waveform from trigger circuit R, comprising a pulse covering periods P18 . . . P27, to lead 505 and thus to gate G506 so as to maintain the latter open during the BR digit period of the B-word thereby allowing the BR digits to pass from lead 507 to lead 501 and thence by way of lead 17 to the adding device 410 of the control tube for modifying the R address digits of the PI word which are then emerging from the rear unit 406.

During beat S2 the modified PI word emerges from the adding device 410 for use, in its altered form, to set up the various address selecting and function determining trigger circuits already described. It is also passed, however, by way of lead 18 and gate G600 to the trigger circuits BA27, BA28 and BA29 of the B tube so as to set up the latter in accordance with its, possibly altered, configuration of the B store address digits: this assumes that the B word itself contained a modifying pulse within positions P27, P28 and P29. The modified address setting of these three trigger circuits is made effective upon the Y-shift generator 608 of the B tube during the following beat A2 through gates G602, G607 and G612. This is to enable any chosen line of the B tube 600 to be made effective during beat A2 for possible modification by a word read out from the address P of the main store and fed from the main store read output busbar 10 by way of gate G624 to the subtractor device 609 of the B tube. Such an operation, is, of course, demanded by a particular function digit code signal and serves the purpose of allowing alteration of the B word itself within its store as described in the foresaid copending application No. 226,763, filed May 17, 1951, now Patent No. 2,800,277, of F. C. Williams et al.

Systematic regeneration of the various B-words recorded within the B tube 600 is effected by the supply through gates G605, G610 and G615 of the Counter waveforms C1, C2 and C3 during beat S1.

Figure 7:
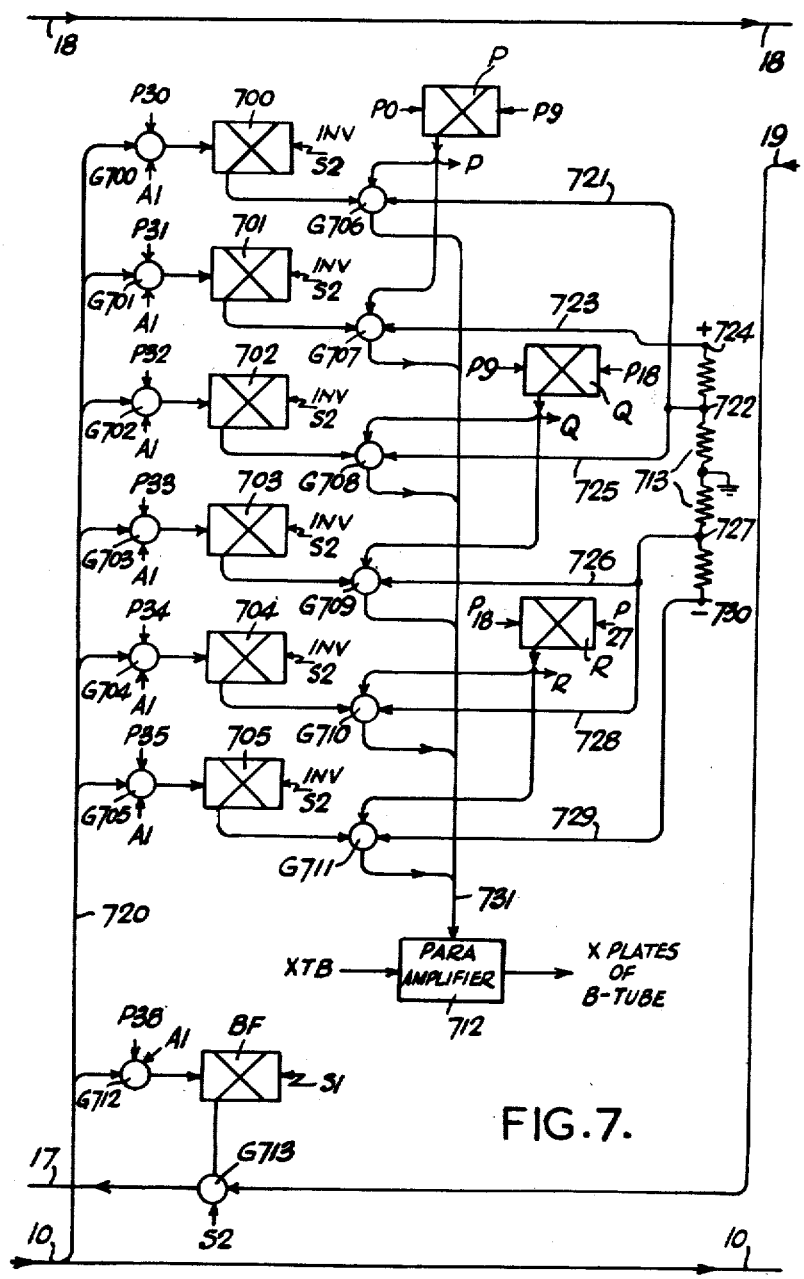
Figure 10:
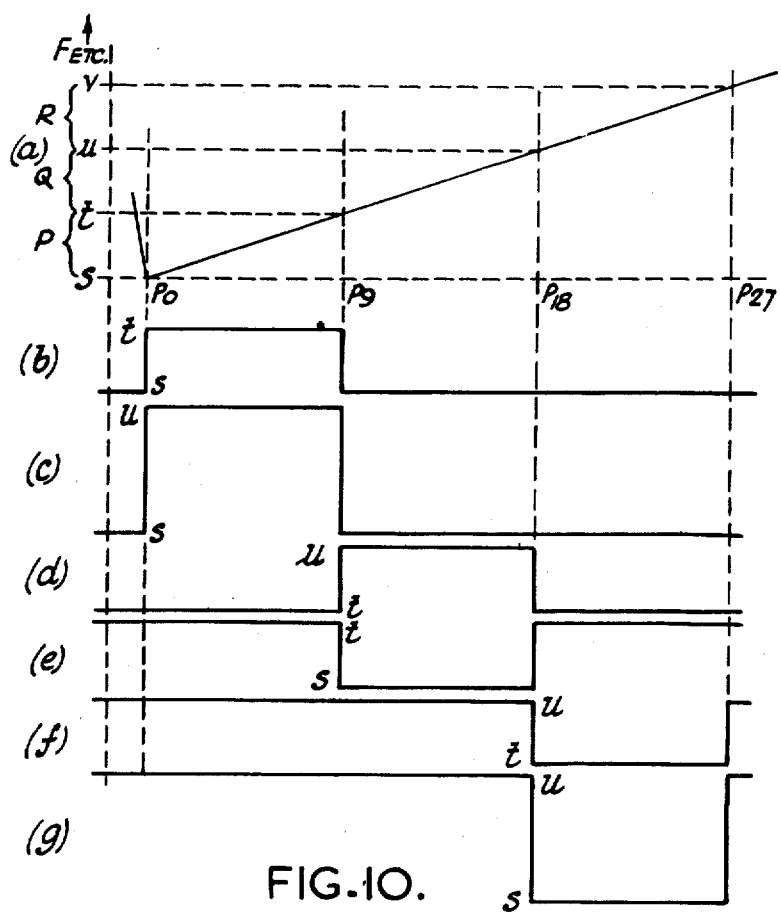
Fig. 10 illustrates a number of electric waveforms in use in the arrangement of Fig. 7.

Figs. 7 and 10 illustrate an alternative method of providing the facilities of modifying any address P, Q or R of the PI word with any set of B digits BP, BQ or BR. These facilities are provided by appropriately controlling the X-deflection of the beam of the B tube 600, it being assumed, as is usually the case that each B word is stored on one line of the B tube. Such an assumption has already been made in connection with the first embodiment.

Fig. 7 illustrates the necessary modified form of the B tube control circuits and this figure is to be regarded as substituted in place of Fig. 5 in the previous sequence of Figs. 1 to 6, the various interconnecting leads being joined according to their applied reference numerals.

Referring to Fig. 7 the modified arrangements comprise a series of six two-stable-state trigger circuits 700 . . . 705 each of which is supplied at its resetting terminal with the differentiated INV S2 waveform and has its triggering input terminal connected by way of associated gates G700 . . . G705 to conductor 720 which is supplied from the main store read output busbar 10. Gates G700 . . . G705 are controlled respectively by the P30 . . . P35 pulse waveforms and also by the A1 waveform.

The arrangement also comprises two-stable-state trigger circuits P, Q and R generating the P, Q and R waveforms of Figs. 8h, 8i and 8j and identical, so far as their triggering and resetting is concerned, with the similar trigger circuits of Fig. 5 already described.

The "1" output terminal of trigger circuit 700 is connected to gate G706 also controlled by the P waveform output from trigger circuit P and additionally connected by way of lead 721 with a tapping point 722 upon a potentiometer network 713 connected at opposite ends to positive and negative sources of potential and having its centre point earthed. The "1" output from trigger circuit 701 similarly supplies a gate G707 also controlled by the P waveform from trigger circuit P and connected additionally by way of lead 723 to a more positive tapping point 724 on network 713. Trigger circuit 702 supplies, from its "1" output terminal, one controlling input to a gate G708 which is also supplied with the Q waveform from trigger circuit Q and connected additionally by way of lead 725 with the tapping point 722 on the network 713. Trigger circuit 703 has its "1" output terminal connected to one controlling input of gate G707 which is also controlled by the Q waveform from trigger circuit Q and by way of lead 726 to a negative tapping point 727 on the network 713. Trigger circuit 704 has its "1" output terminal connected to a controlling input of gate G710 which is also controlled by the R waveform from trigger circuit R and is additionally supplied by way of lead 728 with a potential from the tapping point 727 on the network 713. Trigger circuit 705 has its "1" output terminal connected to one controlling input of gate G711 also controlled by the R waveform of trigger circuit R and connected by way of lead 729 with the most negative tapping point 730 on the network 713. The output from each of the gates G706 . . . G711 is connected by way of lead 731 to a paraphase amplifier 712 which is, in this embodiment, connected in the supply route of the XTB waveform to the X plates of the B tube. The potentials on lead 731 are applied within the paraphase amplifier 712 to suitable X-shift producing means such as by way of leak resistors to the opposite phase output terminals supplying the X-deflection plates of the B-tube 600, Fig. 6, whereby the normal sawtooth waveforms are superimposed upon a standing bias potential determined by the potential on lead 731.

The various tapping points 722, 724, 727 and 730 on the potentiometer network 713 are arranged to supply suitably graded output potentials providing four different stepped values of X-shift as indicated in Figs. 10b, 10c, 10f and 10g. The value of such shift steps is as follows. Referring to Fig. 10a which illustrates an initial portion of the normal linear run-down of the XTB waveform, the single unit shift step provided by the potential at tapping point 722, shown in Figs. 10b and 10d, equal to α displacement of the XTB voltage from level s to level t, Fig. 10a or from level t to level u. In other words, with relation to the scanning of the different digit storage positions in the B-word storage line, it is equivalent to a shift from digit position P0 to digit position P9 or from digit position P9 to digit position P18. The two unit shift provided by the potential at tapping point 724, shown in Fig. 10c, is equal to a displacement of the XTB voltage from level s to level u, Fig. 10a or, in other words, from digit position P0 to digit position P18. Similarly the single-unit shift (of opposite polarity) provided by the potential at tapping point 727, shown in Figs. 10e and 10f, is equal to a displacement of the XTB voltage from level t to level s or from level u to level t, Fig. 10a, or, in other words, from digit position P9 to digit position P0 or from digit position P18 to digit position P9. In the same manner, the two unit shift (also of opposite polarity) provided by tapping point 730, shown in Fig. 10g, is equal to a displacement of the XTB voltage from level u to level s, Fig. 10a or, in other words, from digit position P18 to digit position P0.

The arrangement of Fig. 7 also includes the B function detector gate G712 controlling the trigger circuit BF as in the original arrangement of Fig. 5, the latter controlling the gate G713 which is now the only gate between the lead 19 from the read unit 606 of the B tube and the lead 17 supplying the adding device 410 of the control tube 400, Fig. 4.

It will be noted that in this modified arrangement, in order to provide the extra facility detailed above it is necessary to provide three further B select digits in the PI word, namely the six digits P30 . . . P35. In consequence it is necessary to dispense with three of the previous function digits P33, P34 and P35. Obviously other arrangements may be made, for example, by extending the length of the PI word to include more digits or alternatively, by restricting the address selecting portions of the PI word with consequent reduction of selection facilities in the main store.

In the operation of this modified arrangement the normal machine cycle proceeds as already described but upon the occurrence of B select digit P30 in the PI word, gate G700 will pass such digit to cause triggering of the trigger circuit 700 during beat A1 thereby allowing gate G706 to open during the period of the P waveform in the next following beat S2 to supply the potential at tapping point 722 (equivalent to an onward shift of the beam of tube 600 from scanning position P0 of the storage line to scanning position P9 of such storage line) to the amplifier 712. As a result, that part of the selected B-tube storage line containing the BQ digits, P9 . . . P17, is scanned during the machine rhythm time of digit intervals P0 . . . P8 covering the P address digits of the PI word. Such BQ digits will be made available on lead 19 for application through gate G713 (assumed to be open) to the adding circuit 410 of the control tube 400, Fig. 4. If, on the other hand, the B select digit P31 is present then trigger circuit 701 will be triggered through gate G701 in beat A1 and gate G707 will be opened in the following beat S2 by the P waveform to apply the potential at tapping point 724 to the lead 731 thereby shifting the starting position of the tube beam scanning motion during the P address digit period from the normal position of P0 to the position storing digit P19 whereby the normal linear sawtooth X time base deflection will cause the BR digits of the selected B-word to be made available on the lead 19 and supplied through gate G713 to the adding device 420 of the control tube 400, Fig. 4, for combination with the P address digits then issuing from the read unit 406.

If the B select digits P32 is present then trigger circuit 702 will be turned on in beat A1 and, through gate G708 under the control of the Q waveform, the shift potential at tapping point 722 of the network 713 will be applied in beat S2 to amplifier 712 during the Q address digit period of digit intervals P9 . . . P17. The resultant X shift in the B-tube 600 will cause that part of the selected B-word storage line containing the BR digits P19 . . . P26 to be scanned and signals representing such stored BR digits to be fed out over lead 19 and through gate G713 to the adder circuit 410 to the control circuit 400 for combination with the Q address digits of the PI word then issuing from the read unit 406. In somewhat similar manner the presence of the B select digit P33 will operate trigger circuit 703 in beat A1 to open gate 709 during the pulse period of the Q waveform in beat S2 thereby applying the shift potential at tapping point 727 of the network 713 to the amplifier 712. This causes a line direction shift of the beam of the B-tube 600 so that it operates over the storage position of the BP digits, P0 . . . P8 during the period of the Q digits P9 . . . P17 of the PI word and the consequential feeding of such BP digits over lead 19 and through gate G713 to the adder device 410 of the control tube 400 for combination with the Q digits of the PI word then emerging from the read unit 406.

Similarly the presence of B select pulses P34 will enable trigger circuit 704 to be turned on in beat A1 to allow gate G710 to open during the period of the R waveform in beat S2 thereby applying, during that period, the shift potential at tapping point 727 of the network 713 to the amplifier 712 whereby the beam of the B tube 600 scans the storage position of the BQ digits P9 . . . P17 during the digit intervals, P18 . . . P27. This causes the BQ digits of the selected B-word to be read out and fed over lead 19 and through gate G713 to the adder device 410 of the control tube 400 for combination with the R digits of the PI word then emerging from the read unit 406. Similarly the presence of B select digits P35 will operate trigger circuit 705 during the beat A1 to open gate G711 during the period of the R waveform in beat S2 and thereby to apply the shift potential at tapping point 730 to the amplifier 712 whereby the beam of the B-tube 600 scans the BP digit storage positions P0 . . . P8 during the digit intervals P18 . . . P27 thereby applying the BP digits over lead 19 and gate G713 to the adder device 410 of the control tube 400 for combination with the R digits of the PI word which are then emerging from the read unit 406.

Figure 12:
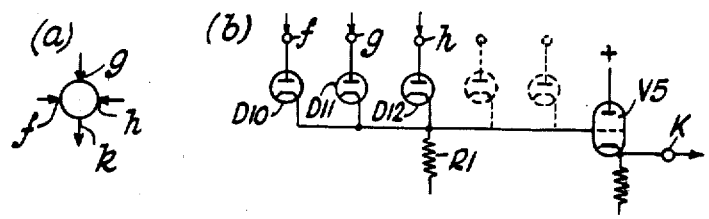
Figs. 11, 12 and 13 illustrate a detailed interpretation of certain symbols used in the drawings.

It will be appreciated that the gates G706, G707 and G708 will need to be of a suitably modified form to deal with the positive (to earth) potentials from tapping points 722 and 724 controlled thereby. For example, a normal diode type "And" gate as shown in Fig. 12, controlled by the two associated trigger circuit outputs may, in turn, control the grid voltage of a valve having an anode load and a potentiometer network between its anode and a source of negative potential. The tapping point on the potentiometer, adjusted to be at earth level when the valve is on, is then connected to the cathode of a diode whose anode is joined to the gate output terminal and via a resistance to the input from the related tapping point on network 713.

Obviously by suitable combination of the various B select digits P30 . . . P35 any required combination of the BP, BQ and BR digits may be made with the P, Q and R digits of the PI word. By omitting all of the B select digits an operation equivalent to the standard B function may be obtained, that is to say that BP digits will modify the P digits, the BQ digits will modify the Q digits and the BR digits will modify the R digits. By using B select digits P33 and P35 the BP digits may be used to modify each of the P, Q and R digits of the PI word.

An economy of digits used for effecting the control described with reference to either of the arrangements may be obtained, particularly if the number of modes of modification can be restricted, by utilising the digits as a binary code signal and providing a decoder which may be of conventional form.

While the arrangements so far described have all been described of a machine operating in the serial mode the invention is obviously applicable to a machine operating in the parallel mode. In this case the routing of the various B digits will be on a location basis instead of on a timing basis and may be achieved, for example, by providing in each of the parallel leads between a register for the various B digits and a register for the PI digits, a pair (input and output) of serially disposed and signal controlled blocking gates and by then appropriately cross-connecting the points between such gates in the corresponding leads of the various P, Q and R digit groups, i.e. the first lead of the P group to the first lead of the Q group and the first lead of the Q group to the first lead of the R group and so on by paths including further signal controlled blocking gates. Potentials for opening or closing such gates are then derived from means, such as trigger circuits, controlled by the potentials on the leads which are controlled by the B select digits in the PI register so as to set up the appropriate input and output and cross-routing paths as is necessary to make the required B digit groups BP, BQ and BR effective upon the different address digit groups P, Q and R in the PI register.

We claim:

1. An electronic digital computing machine comprising a data signal storage device having a plurality of separately identifiable storage addresses, address selecting means operable by an applied address selection control signal for rendering operative any required one of said addresses, a control system having storage means for recording an applied instruction signal and in accordance therewith controlling the operation of the machine during a single operation cycle to select in turn first and second data signal addresses in said data signal storage device necessary to carry out the desired computation step, said instruction signal including a first address selection control signal part for selecting said first data signal address, a second address selection control signal part for selecting said second data signal address and an instruction modification control signal part, instruction signal-modifying means for modifying the form of said applied instruction signal in said control system storage means by combination of an applied external modification signal therewith, a source of such modification signals and modification selector means controlled by said instruction modification control signal part of said applied instruction signal for causing the combination of said external modification signal with neither, either or both of said first and second address selection control signal parts in accordance with the form of said instruction modification control signal part before application of said first and second address selection control signal parts to said address selecting means of said data signal storage device.

2. An electronic digital computing machine comprising a data signal storage device having a plurality of separately identifiable addresses, address selecting means operable by an applied address selection control signal for rendering operative any required one of said addresses, a control system having storage means for recording an applied instruction signal and in accordance therewith controlling the operation of the machine during a single operation cycle to select in turn first and second data signal addresses in said data signal storage device necessary to carry out the desired computation step, said instruction signal including a first address selection control signal part for application to said address selecting means to select said first address, a second address selection control signal part for application to said address selecting means to select said second address and an instruction modification control signal part, instruction signal-modifying means for modifying the form of said applied instruction signal in said control system storage means by combination of an applied external modification signal therewith, a source of a modification signal comprising a first modifying part and a second modifying part and modification selector means controlled by said instruction modification control signal part of said applied instruction signal for causing the selective combination of one or other of said first and second parts of said external modification signal with neither, either or both of said first and second address selection control signal parts in accordance with the form of said instruction modification control signal part before application of said first and second address selection control signal parts to said address selecting means of said data signal storage device.

3. An electronic digital computing machine comprising a data signal storage device having a plurality of separately identifiable storage addresses, address selecting means operable by an applied address selection control signal for rendering operative any required one of said addresses, a control system having storage means for recording an applied instruction signal and in accordance therewith controlling the operation of the machine during an operation cycle to select a first, then a second and then a third signal storage address in said data signal storage device necessary to carry out the desired computation step, said instruction signal including a first address selection control signal part, a second address selection control signal part and a third address selection control signal part and an instruction-modification control signal part, instruction-signal modifying means for modifying the form of an applied instruction signal while in said control system storage means by combination of an applied external modification signal therewith, a source of such modification signal and modification selector means controlled by said instruction modification control signal part of said applied instruction signal for effecting selective combination of said external modification signal with any one or more of said first, second and third address selection control signal parts in accordance with the form of said instruction modification control signal part before the application of said first, second and third address selection control signal parts respectively to said address selecting means.

4. An electronic digital computing machine comprising a data signal storage device having a plurality of separately identifiable storage addresses, address selecting means controlled by an applied address selection control signal for rendering operative any required one of said addresses, a control system having storage means for recording an applied instruction signal and in accordance therewith controlling the operation of the machine during an operation cycle to select a first, then a second and then a third signal storage address in said data signal storage device necessary to carry out the desired computation step, said instruction signal including a first address selection control signal part, a second address selection control signal part and a third address selection control signal part and an instruction signal modification control signal part, instruction signal modifying means for modifying the form of an applied instruction signal while in said control system storage means by combination of an applied external modification signal therewith, a source of a modification signal having a first, a second and a third modifying part and modification selector means controlled by said instruction modification control signal part of said applied instruction signal for selectively applying, in accordance with the form of said instruction modification control signal part, said first, second or third modifying part of said external modification signal to said instruction signal-modifying means in coincidence with the application to said same instruction signal modifying means of each of said first, second and third address selection control signal parts before application of said first, second and third address selection control signal parts to said address selecting means.

5. An electronic digital computing machine operating rhythmically in the serial mode with number and instruction words each expressed dynamically as electric pulse signal trains and comprising a control system having storage means for recording an applied instruction word pulse signal train for use in the immediately subsequent part of the operation cycle of the machine, said instruction word pulse signal train comprising sequentially occurring first storage address selection control, second storage address selection control and instruction modification control parts, instruction signal modifying means having a first input for receiving said instruction word pulse signal train, a second input for receiving an external modification word pulse signal train and an output for providing a modified instruction pulse signal train by the combination of said modification signal with said original instruction signal, a source of an instruction modification pulse signal train and modification selector means including timing-altering means controlled by said instruction modification control part of said applied instruction signal for applying said modifying pulse signal train and said instruction pulse signal train to said modifying means with at least one of two alternative timing relationships to said instruction signal to effect modification of either said first storage address selection control part or said second address selection control part of said instruction pulse signal train before use in said control system.

6. An electronic digital computing machine according to claim 5 wherein said timing altering means comprises a first signal transfer path between said instruction modification signal source and said instruction signal modifying means, a second signal transfer path including at least signal delay means between said instruction modification signal source and said instruction signal modifying means and in which said modification selector means includes electric signal controlled switching means for selectively rendering said signal transfer paths operative in accordance with the form of said instruction modification control part of said instruction signal.

7. An electronic digital computing machine according to claim 6 in which said modification selector means comprises a plurality of trigger circuits each arranged to be controlled by different signal elements of said instruction modification control part of said instruction signal in said control system, a plurality of waveform generators providing output pulses embracing respectively the signalling times in said instruction pulse signal train of said first and second storage address selector control parts and in which said electric signal controlled switching means comprises a plurality of gates controlled respectively by different combinations of the outputs from said trigger circuits and said waveform generators.

8. An electronic digital computing machine according to claim 7 wherein said timing altering means includes two serially arranged signal delay devices each imposing a delay equal to the length of said first or said second storage address selection control part of said instruction pulse signal train, an input connection for applying said modification pulse signal train to the first of said signal delay devices, an output connection for supplying modification pulse signals to said second input of said instruction signal modifying means and wherein said electric signal controlled switching means consists of three separate gate circuits connected respectively between said output connection and the input to said first delay circuit, between said output connection and the junction between said delay circuits and between said output connection and the output from said last delay circuit.

9. An electronic digital computing machine operating rhythmically in the serial mode with number and instruction words each expressed dynamically as electric pulse signal trains and comprising a control system having storage means for recording an applied instruction word pulse signal train for use in the immediately subsequent part of the operation cycle of the machine, said instruction word pulse signal train comprising sequentially occurring first storage address selection control, second storage address selection control and instruction modification control parts, instruction signal modifying means having a first input for receiving said instruction word pulse signal train, a second input for receiving an external modification word pulse signal train and an output for providing a modified instruction pulse signal train by the combination of said modification signal with said original instruction signal, a source of an instruction modification pulse signal train and modification selector means including timing-altering means controlled by said instruction modification control part of said applied instruction signal for applying said modifying pulse signal train and said instruction pulse signal train to said modifying means with at least one of two alternative timing relationships to said instruction signal to effect modification of either said first storage address selection control part or said second address selection control part of said instruction pulse signal train before use in said control system, said source of an instruction modification pulse signal train comprising a word storage device having means for selectively reading separate portions of a stored word at predetermined time instants in the machine operating cycle controlled by said modification selector means.

10. An electronic digital computing machine as claimed in claim 9 wherein said source of instruction modification pulse signal trains comprises an electrostatic cathode ray tube storage device in which respective elements of the pulse signal train are recorded at predetermined positions along a linear scanning line of the tube screen and in which said selective reading means comprises apparatus for superimposing a shift in the line scanning direction upon the normal line scanning motion of the cathode ray tube beam.

11. An electronic digital computing machine according to claim 10 in which said modification selector means comprises a plurality of trigger circuits each arranged to be controlled by different signal elements of said instruction modification control part of said instruction signal in said control system, a plurality of waveform generators providing output pulses embracing respectively the signalling times in said instruction pulse signal train of said first and second storage address selection control parts, a plurality of sources of shift potential, a plurality of gates and circuit means each including one of said gates connecting said shift potential sources to said shift imposing apparatus, said plurality of gates being controlled by different combinations of the outputs from said trigger circuits and said waveform generators for controlling the amount of superimposed shift of the tube beam.

12. An electronic digital computing machine according to claim 11 which includes at least two sources of potential each suitable for imposing a beam shift of equal amounts but of opposing directions along the scanning line path of the beam of said storage tube and in which said plurality of gate circuits controlled by said trigger circuits and said waveform generators are connected so as selectively to apply an appropriate one of said shift potentials to said shift imposing apparatus at appropriately timed instants during the reading out of said modification pulse signal train from said storage tube.

References Cited in the file of this patent
UNITED STATES PATENTS

| | | |
|---|---|---|
| 2,800,277 | Williams | July 23, 1957 |
| 2,810,516 | Tootill | Oct. 22, 1957 |

(Other references on following page)

OTHER REFERENCES

Lecture 47, June 30, 1948. "Description of Serial Acoustic Binary EDVAC" by Sharpless from "Theory and Techn. for Design of Electronic Digital Computer," vol. IV, Univ. of Pa. Pages 47-1 to 47-12 (12 pages), Figs. PY-0-219, MS-119-1, PY-0-216, 47-15 (4 pages).

"The University of Manchester Universal High-Speed Digital Computing Machine," by Kilburn, Nature, pages 684-687. October 1949.

Functional Description of the EDVAC Moore School of Elec. Engrg., Univ. of Pa., November 1, 1949. Vol. I, pages 1-1 to 1-4, and 2-9 to 2-11; vol. II, Fig. 104-2LD-7.

A Functional Description of the EDVAC Moore School of Electrical Engineering, U. of Pa., November 1, 1949. Vol. I, pages 2-38 to 2-58. Vol II, Figures 104-2LC-10; 104-2LA-14; 104-2LD-12; 104-2LC-9; 104-2LD-5; 104-2LD-8.